US008200184B2

(12) United States Patent
Hamada et al.

(10) Patent No.: US 8,200,184 B2
(45) Date of Patent: Jun. 12, 2012

(54) EVACUATION ROUTE OBTAINING SYSTEM, MOBILE TERMINAL APPARATUS, EVACUATION DIRECTIVE APPARATUS, EVACUATION ROUTE OBTAINING METHOD, EVACUATION ROUTE SENDING METHOD, COMPUTER-READABLE STORAGE MEDIUM, AND ELECTRONIC CONFERENCE SYSTEM

(75) Inventors: Kazuyuki Hamada, Osaka (JP); Hitoshi Nagahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 650 days.

(21) Appl. No.: 12/386,951

(22) Filed: Apr. 24, 2009

(65) Prior Publication Data

US 2009/0270065 A1      Oct. 29, 2009

(30) Foreign Application Priority Data

Apr. 25, 2008   (JP) .................................. 2008-116208

(51) Int. Cl.
    *H04M 11/04*        (2006.01)
(52) U.S. Cl. ................ 455/404.1; 455/412.2; 455/414.2; 455/415; 455/456.1; 455/521; 455/500; 455/525
(58) Field of Classification Search ............... 455/412.2, 455/414.2, 415, 456.1, 521, 500, 525
    See application file for complete search history.

(56) References Cited

U.S. PATENT DOCUMENTS

| | | | |
|---|---|---|---|
| 7,035,650 B1 * | 4/2006 | Moskowitz et al. | 455/456.5 |
| 7,570,938 B2 * | 8/2009 | Kwon | 455/404.1 |
| 7,880,610 B2 * | 2/2011 | Tanner et al. | 340/539.26 |
| 2005/0190053 A1 * | 9/2005 | Dione | 340/500 |
| 2007/0049259 A1 | 3/2007 | Onishi et al. | |

(Continued)

FOREIGN PATENT DOCUMENTS

JP        2002-090172 A        3/2002

(Continued)

OTHER PUBLICATIONS

U.S. Appl. No. 12/453,048, filed Apr. 28, 2009, Hamada et al.

*Primary Examiner* — Kwasi Karikari
(74) *Attorney, Agent, or Firm* — Edwards Wildman Palmer LLP; David G. Conlin; David A. Tucker

(57) ABSTRACT

In an evacuation route obtaining system according to the present invention, a mobile terminal apparatus and a plurality of display apparatuses are connected to each other via a wireless network. The plurality of display apparatuses are connected to corresponding storage apparatuses respectively. The mobile terminal apparatus includes: an arithmetic section for calculating a positional relationship between the mobile terminal apparatus and each of the plurality of display apparatuses; a destination selecting section for selecting a particular display apparatus from among the plurality of display apparatuses based on a result of the calculation carried out by the arithmetic section; a communication section for sending request data to the particular display apparatus selected by the destination selecting section, and receiving evacuation route information that has been read out of the storage apparatus corresponding to the particular display apparatus and customized in accordance with an installation site of the particular display apparatus; and a display section for displaying the evacuation route information received by the communication section. This realizes a system which (i) provides a user with easy operation procedures, (ii) provides the user with an evacuation route suitable for a real-time situation, and (iii) evacuates the user safely and successfully while making the user feel secure.

19 Claims, 20 Drawing Sheets

U.S. PATENT DOCUMENTS

2009/0170468 A1 * 7/2009 Kane et al. ............... 455/404.2

FOREIGN PATENT DOCUMENTS

| JP | 2003-242580 | 8/2003 |
| JP | 2005-017027 | 1/2005 |
| JP | 2005-156325 A | 6/2005 |
| JP | 2006-270159 A | 10/2006 |
| JP | 2007-027862 A | 2/2007 |
| JP | 2007-60370 | 3/2007 |
| JP | 2008-042483 A | 2/2008 |

* cited by examiner

FIG. 15

| STORAGE LAYER | | | TARGET INFORMATION | |
|---|---|---|---|---|
| LAYER | ATTRIBUTES OF STORAGE LAYER | ATTRIBUTES OF INFORMATION | EXAMPLE OF INFORMATION | |
| FIRST INFORMATION STORAGE LAYER | READ-ONLY | PROGRAM | • OPTICAL DISC DRIVE CONTROL PROGRAM<br>• FILE MANAGING PROGRAM<br>• VARIOUS APPLICATION PROGRAMS, ETC. | |
| | | CONTENT | • Data Of Instructions In The Event That Earthquake Early Warning Is Broadcasted And Evacuation Route Map Used In The Event That Earthquake Early Warning Is Broadcasted (Video Data, Audio Data, And Print Data)<br>• Data Of Instructions In The Event That Emergency Warning Is Broadcasted And Evacuation Route Map Used In The Event That Emergency Warning Is Broadcasted (Video Data, Audio Data, And Print Data) | |
| SECOND INFORMATION STORAGE LAYER | RE-WRITABLE | DATA | • DATA CREATED ON APPLICATION PROGRAM (CONFERENCE PROCEEDINGS DATA) | |

EVACUATION ROUTE OBTAINING SYSTEM, MOBILE TERMINAL APPARATUS, EVACUATION DIRECTIVE APPARATUS, EVACUATION ROUTE OBTAINING METHOD, EVACUATION ROUTE SENDING METHOD, COMPUTER-READABLE STORAGE MEDIUM, AND ELECTRONIC CONFERENCE SYSTEM

This Nonprovisional application claims priority under 35 U.S.C. §119 (a) on Patent Application No. 2008-116208 filed in Japan on Apr. 25, 2008, the entire contents of which are hereby incorporated by reference.

TECHNICAL FIELD

The present invention relates to a system for appropriately evacuating a user in an emergency situation, a disaster for example, and the like.

BACKGROUND ART

Currently, an earthquake forecast, a tsunami forecast, or the like has been broadcasted on TV as a prompt report. However, in a case where, for example, an earthquake or a tsunami occurs at the time that a conference is taken place with the use of a display apparatus for displaying information, participants in the conference cannot obtain any disaster information, for example, an earthquake forecast or a tsunami forecast. Further, the participants cannot have any information as to: instructions on how to act in a conference room in the event of an earthquake or a tsunami; an evacuation route; and the like. This increases a risk that the participants suffer from a disaster.

Here, Patent Literature 1 (described below) discloses an evacuation route display system including: a mobile communication terminal for evacuating a user carrying the mobile communication terminal to a safe place by obtaining disaster information in a case where a disaster occurs; and a base station, for example. The base station of the evacuation route display system includes (i) a memory for storing evacuation route information including: map information containing information regarding safe areas; and/or information regarding evacuation routes to the safe areas, and (ii) a communication circuit for sending the map information and/or the evacuation route information to the mobile communication terminal in a case where a disaster occurs. Further, in advance of the transmission of the map information and/or the evacuation route information, the base station sends an automatic startup request signal to the mobile communication terminal.

Citation List

Patent Literature 1

Japanese Patent Application Publication, Tokukai, No. 2007-60370 A (Publication Date: Mar. 8, 2007)

However, in the conventional system described above, since a display screen of the mobile communication terminal is small, it is significantly difficult for a user to view a map of the evacuation route information on the display screen. Further, in order to scale-up or scale-down the map, the user has to operate the mobile communication terminal. However, it is considerably difficult for the user to perfectly operate the mobile communication terminal if the user is mentally pressured in an emergency evacuation situation. Therefore, an easier operation procedure is demanded. Furthermore, in a case where, while viewing the evacuation route map in real time, a user finds an evacuation route thus viewed is not available, it is highly difficult for the base station to immediately provide the mobile communication terminal with an alternative evacuation route map.

SUMMARY OF INVENTION

The present invention is made in view of the problem. An object of the present invention is to provide a system which (i) provides a user with easy operation procedures, (ii) provides the user with an evacuation route suitable for a real-time situation, and (iii) evacuates the user successfully and safely while making the user feel secure. An evacuation route obtaining system of the present invention, includes: a mobile terminal apparatus; and a plurality of evacuation directive apparatuses being connected with the mobile terminal apparatus via a network, wherein: each of the plurality of evacuation directive apparatuses includes a sending/receiving section which, when receiving request data from the mobile terminal apparatus, (i) reads, out of a storage section, evacuation route information corresponding to an installation site of the evacuation directive apparatus, and (ii) sends the evacuation route information to the mobile terminal apparatus; and the mobile terminal apparatus includes: an arithmetic section for calculating a positional relationship between the mobile terminal apparatus and each of the plurality of evacuation directive apparatuses; a destination selecting section for selecting a particular evacuation directive apparatus from among the plurality of evacuation directive apparatuses based on a result of the calculation carried out by the arithmetic section; a data communication section for (i) sending the request data to the particular evacuation directive apparatus selected by the destination selecting section, and (ii) receiving the evacuation route information read out by the particular evacuation directive apparatus; and a display section for displaying the evacuation route information received by the data communication section.

With the system described above, the particular evacuation directive apparatus is selected on the mobile terminal apparatus based on the result of calculating the positional relationship between the mobile terminal apparatus and each of the plurality of evacuation directive apparatuses, and then the evacuation route information is obtained from the particular directive apparatus, after that, the evacuation route information is displayed. The evacuation route information corresponds to the installation site of the evacuation directive apparatus, which is a sender of the evacuation route information. Accordingly, it becomes possible for a user, who is being evacuated while carrying a mobile terminal apparatus, to (i) obtain, from a particular evacuation directive apparatus (the closest evacuation directive apparatus, or an evacuation directive apparatus in a user's destination, for example), evacuation route information corresponding to an installation site of the particular evacuation directive apparatus (that is, evacuation route information suitable for a current position of the user who is being evacuated), and (ii) display the evacuation route information.

Thus, with the evacuation route obtaining system according to the present invention, it is possible to (i) provide a user with easy operation procedures, (ii) successfully provide the user with evacuation route information suitable for a real-time situation in an evacuation, and (iii) evacuate the user safely while making the user feel secure.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a block diagram illustrating an arrangement of a mobile terminal apparatus in accordance with an embodiment of the present invention.

FIG. 2 is a block diagram of a display apparatus in accordance with the present embodiment of the present invention.

FIG. 3 is a perspective view of a mobile terminal apparatus in accordance with another embodiment of the present invention.

FIG. 4 is a perspective view of the mobile terminal apparatus illustrated in FIG. 3 in a state where a display section of the mobile terminal apparatus is slid so that an input section of the mobile terminal apparatus is exposed.

FIG. 5 is a block diagram of a UWB wireless transmitter.

FIG. 6 is a block diagram of a UWB wireless receiver.

FIG. 7 is a block diagram of a UWB wireless transceiver.

FIG. 8 is a view illustrating a map showing an evacuation route from a building having a conference room in which the display apparatus in accordance with the present embodiment of the present invention is installed.

FIG. 9 is a view illustrating a conference room in which the display apparatus in accordance with the present embodiment of the present invention is installed.

FIG. 10 is a view schematically illustrating the display apparatus in accordance with the present embodiment of the present invention.

FIG. 11 is a view illustrating an example of conference proceedings displayed on a display section of the display apparatus in accordance with the present embodiment of the present invention.

FIG. 12 is a view illustrating an example of a display of the display apparatus in accordance with the present embodiment of the present invention in a case where an earthquake early warning is detected.

FIG. 13 is a view illustrating an example of the display of the display apparatus in accordance with the present embodiment of the present invention in a case where an emergency warning broadcast is detected.

Figure 14A:
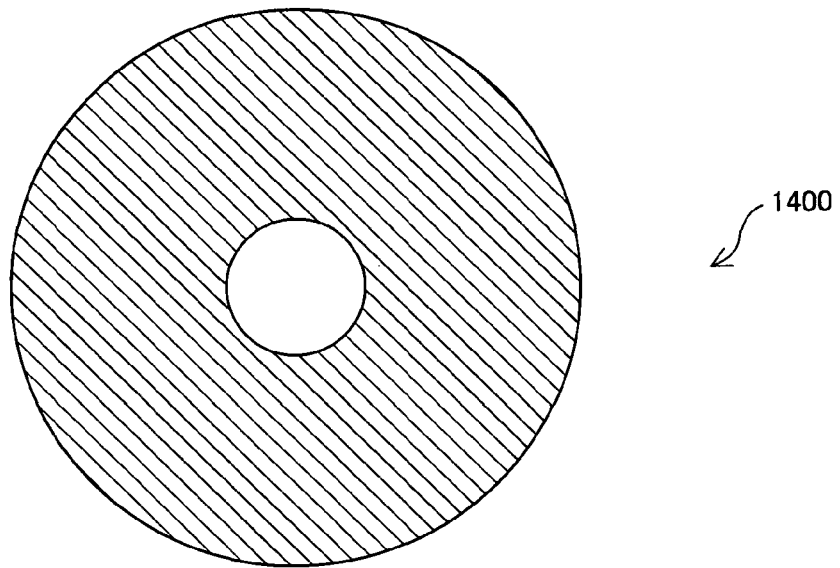
FIG. 14
Figure 14B:
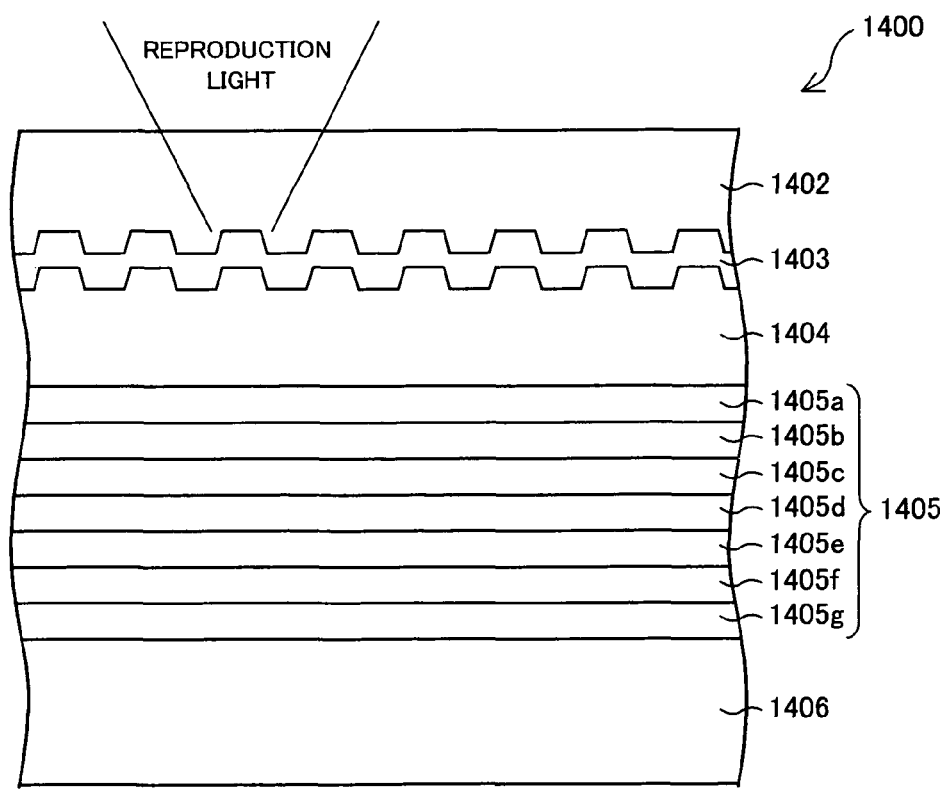

(a) of FIG. 14 is a view schematically illustrating an optical information storage medium used in a storage apparatus in accordance with the present embodiment of the present invention, and (b) of FIG. 14 is a cross-sectional view of the optical information storage medium illustrated in (a) of FIG. 14.

FIG. 15

FIG. 15 is a view illustrating attributes of information that is to be stored on the optical information storage medium illustrated in FIG. 14.

FIG. 16

Figure 16:
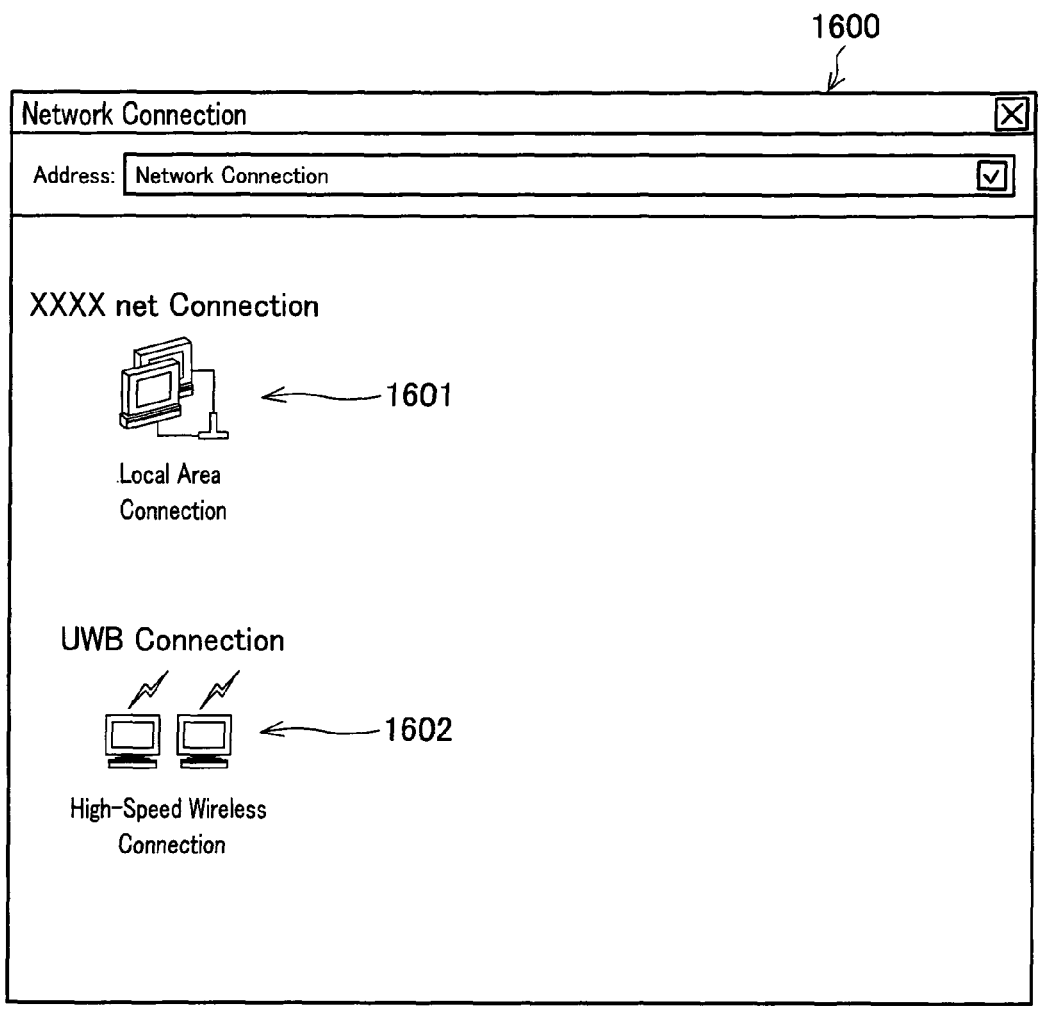

FIG. 16 is a view illustrating an example of a network connection screen displayed on a display section of the mobile terminal apparatus in accordance with the present embodiment of the present invention.

FIG. 17

Figure 17:
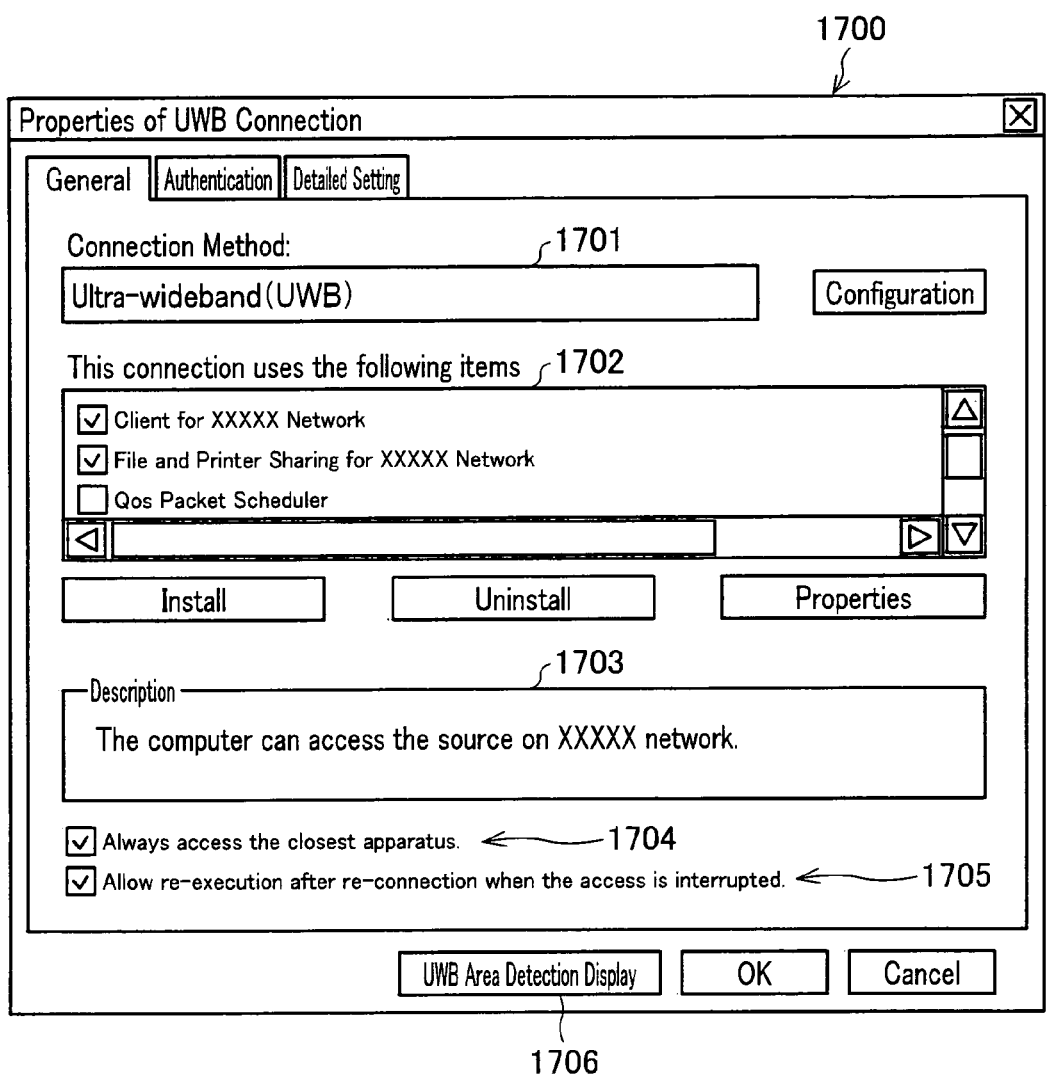

FIG. 17 is a view illustrating a property screen of a UWB connection displayed on the display section of the mobile terminal apparatus in accordance with the present embodiment of the present invention.

FIG. 18

Figure 18:
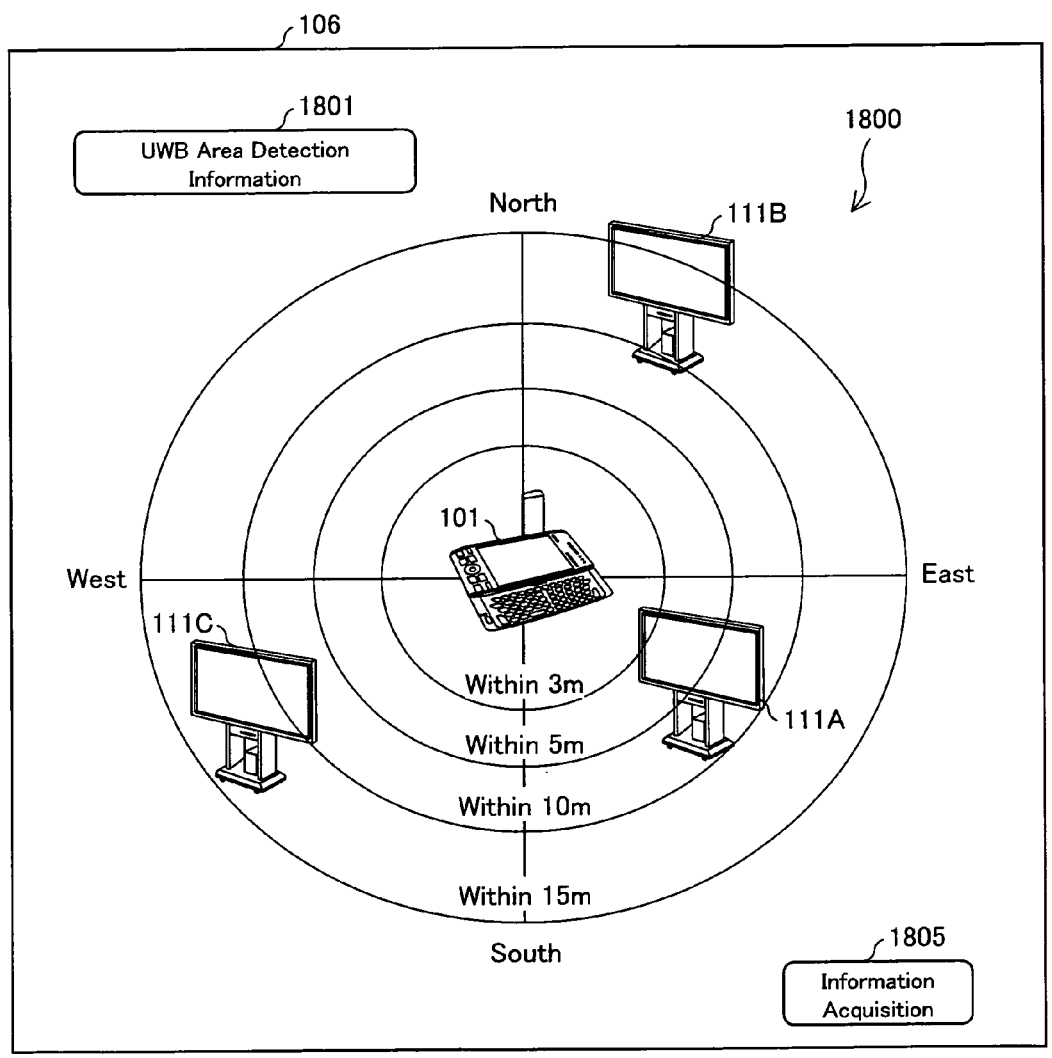

FIG. 18 is a view illustrating an example of a UWB detection screen displayed on the display section of the mobile terminal apparatus in accordance with the present embodiment of the present invention.

FIG. 19

Figure 19:
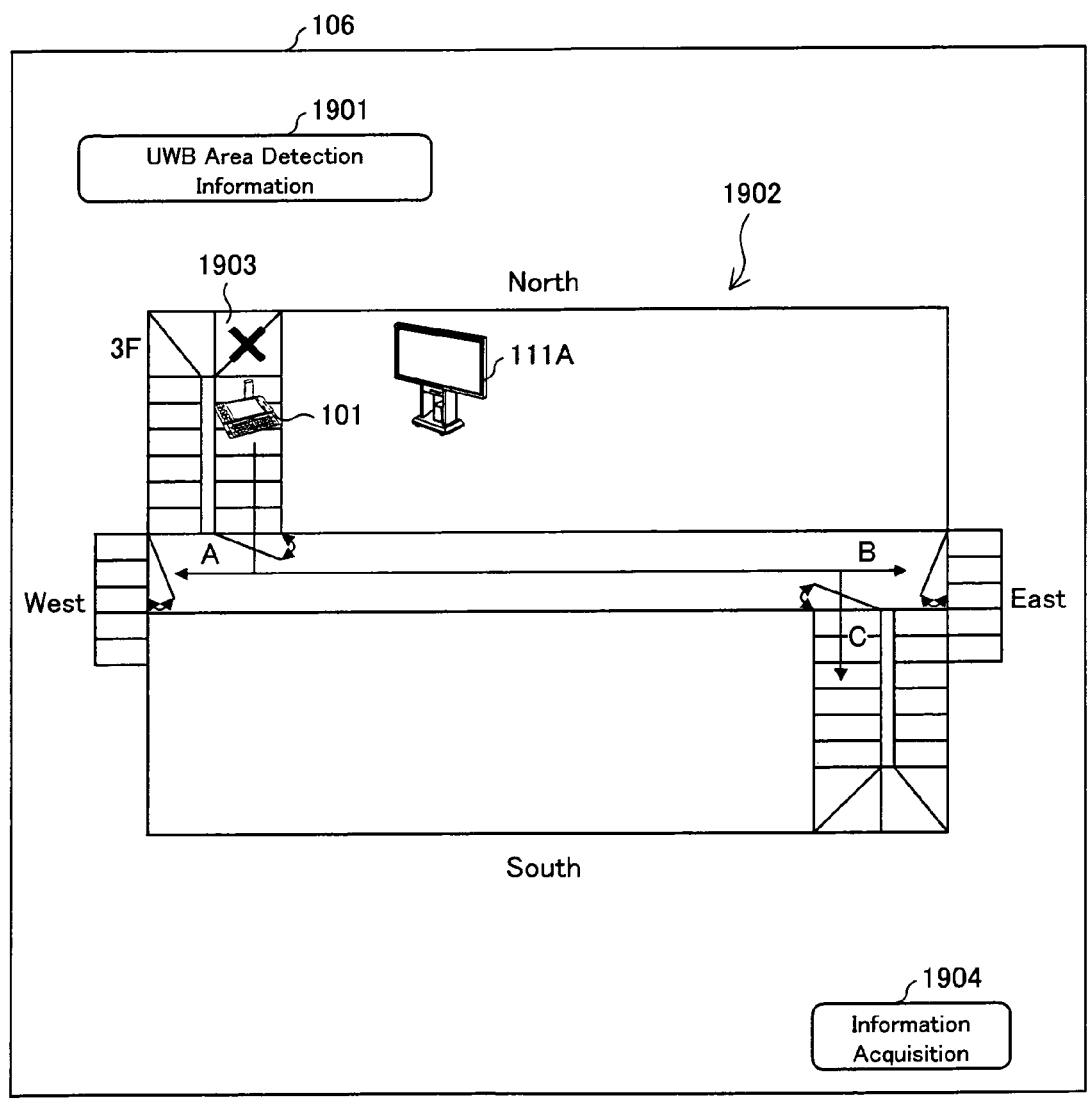

FIG. 19 is a view illustrating a detailed evacuation route map displayed on the display section of the mobile terminal apparatus in accordance with the present embodiment of the present invention.

FIG. 20

Figure 20:
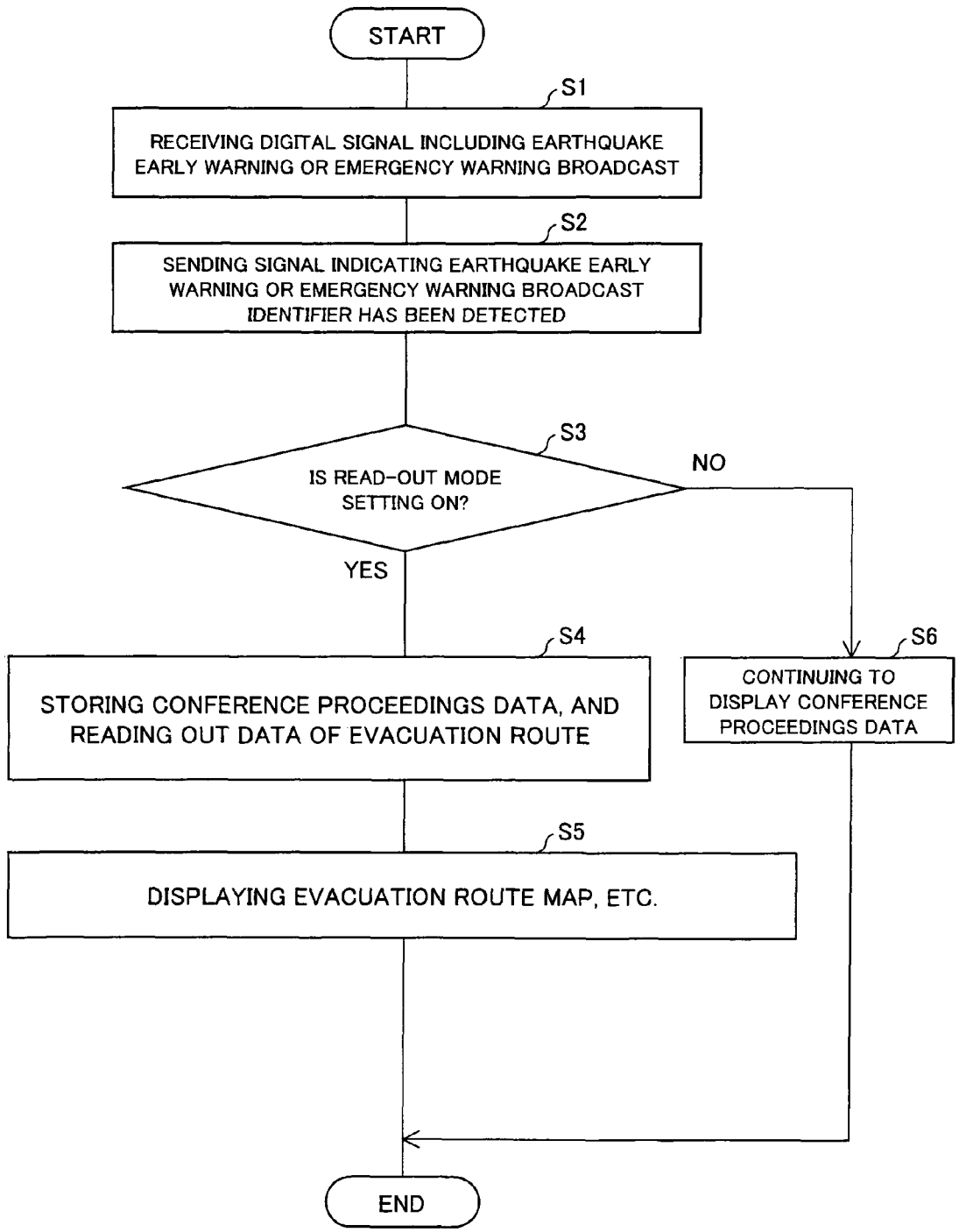

FIG. 20 is a flow chart illustrating processing of the display apparatus in accordance with the present embodiment of the present invention.

FIG. 21

Figure 21:
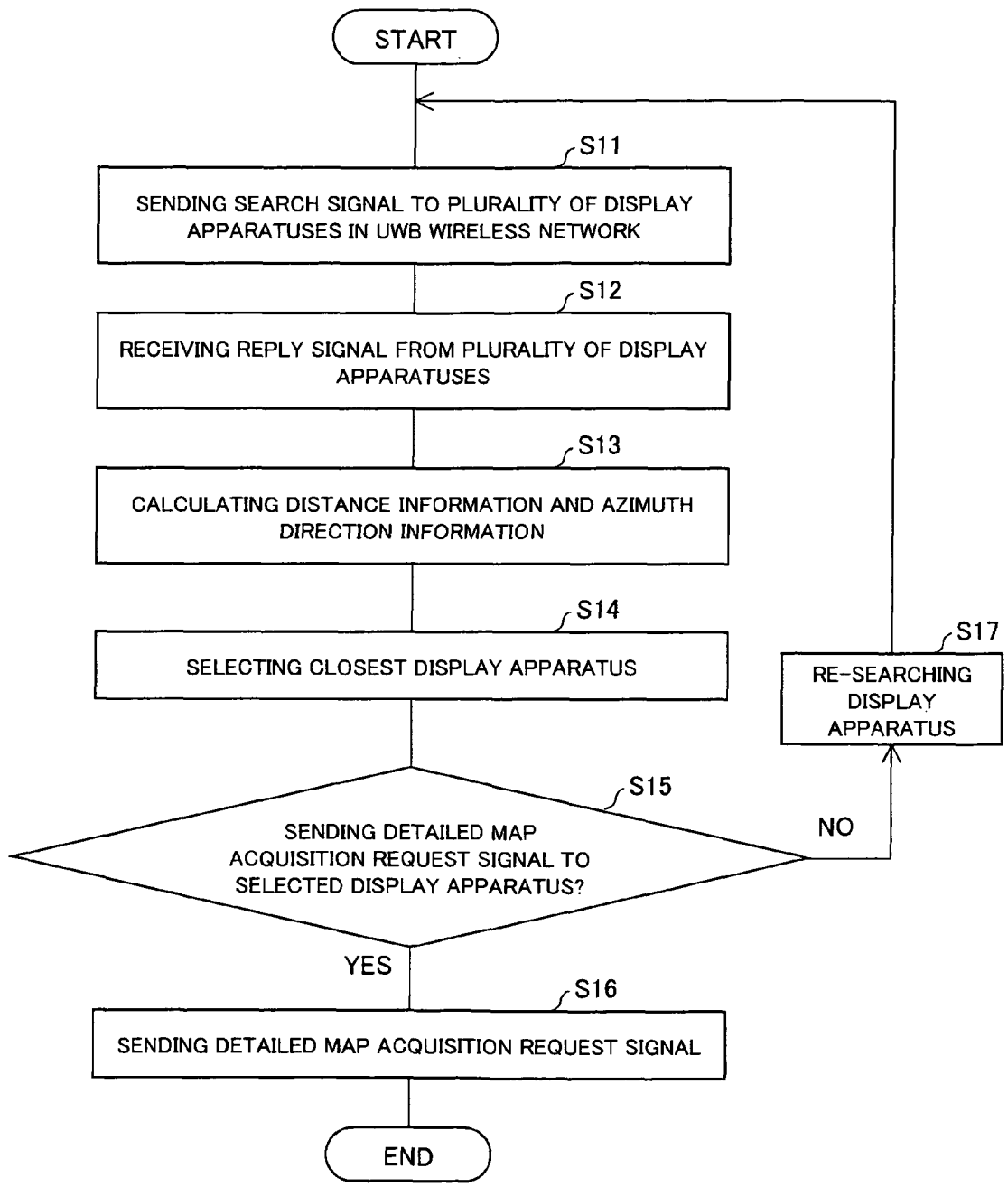

FIG. 21 is a flow chart illustrating processing of the mobile terminal apparatus in accordance with the present embodiment of the present invention.

DESCRIPTION OF EMBODIMENTS

Figure 1:
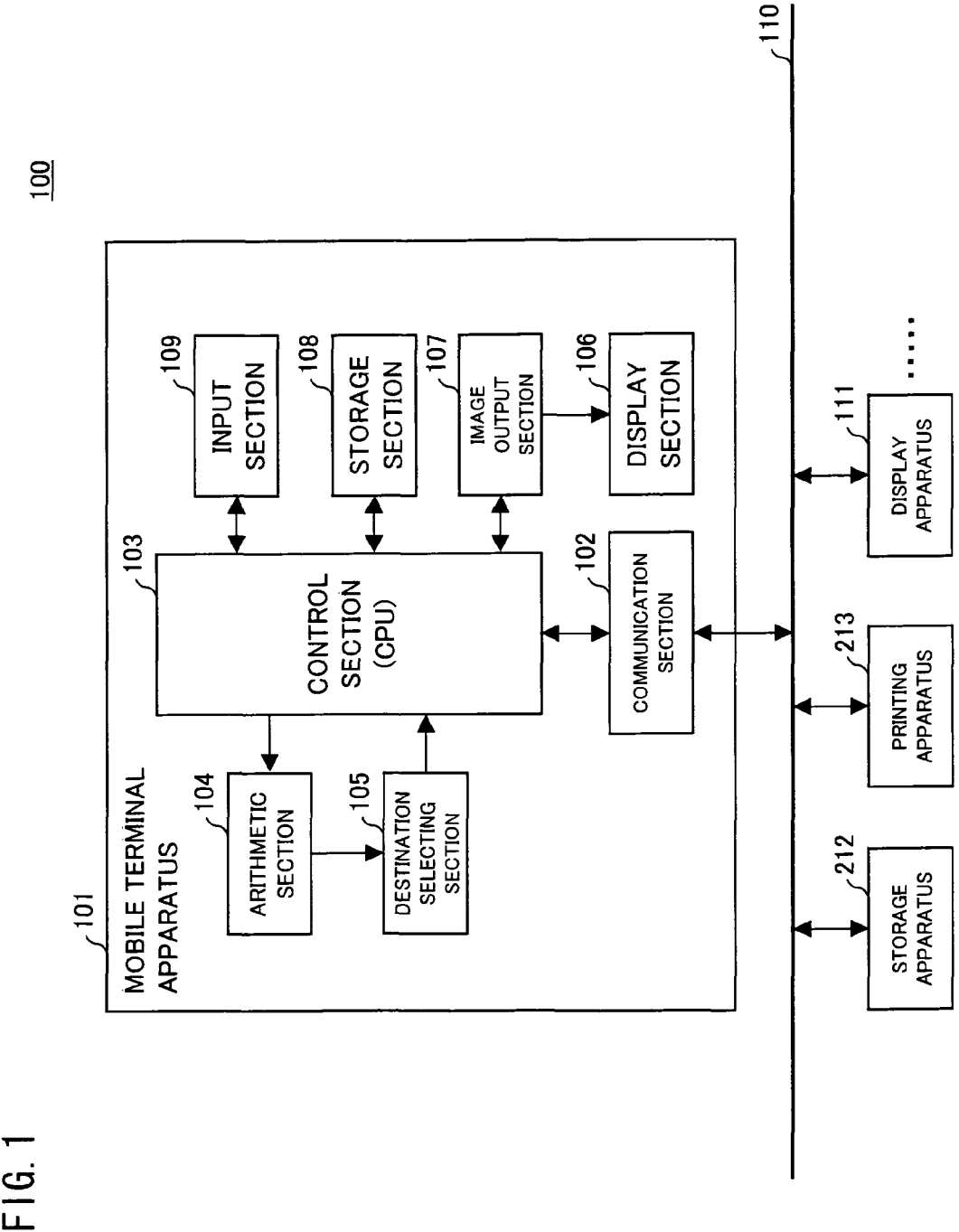
FIG. 1

One embodiment of the present invention is described below with reference to the attached drawings. FIG. 1 is a block diagram of an evacuation route obtaining system 100 in accordance with the present embodiment. The evacuation route obtaining system 100 includes a plurality of display apparatuses (evacuation directive apparatuses) 111, and a mobile terminal apparatus 101. An arrangement of the display apparatus 111 will be described later with reference to FIG. 2. In the present embodiment, explanations are made with a single mobile terminal apparatus 101. However, users carry the mobile terminal apparatuses 101 respectively, and the evacuation route obtaining system 100 includes a plurality of the mobile terminal apparatuses 101.

The mobile terminal apparatus 101 may be a mobile PC, a palmtop PC, a mobile terminal PDA (Personal Digital Assistance), or a mobile phone, for example. The mobile terminal apparatus 101 includes a control section 103, a communication section 102, an arithmetic section 104, a destination selecting section 105, an input section 109, a storage section 108, an image output section 107, and a display section 106.

The communication section 102 sends/receives data to/from other communication apparatuses. The communication section 102 establishes a wireless network 110 between the mobile terminal apparatus 101 and the plurality of display apparatuses 111. Here, in the present embodiment, the communication section 102 employs a UWB communication, and the wireless network between the mobile terminal apparatus 101 and the plurality of display apparatuses 111 is a UWB wireless network. UWB is an abbreviation for "ultrawideband", and is often called "Wireless USB". The UWB wireless network has a frequency band in a range from 3.1 GHz to 10.6 GHz, a 7.5 GHz bandwidth, a transmission power in a range from 0.1 mW to 0.5 mW, and a communication speed equal to or more than 480 Mbps but less than 2 Gbps. Further, the UWB wireless network is a radar wireless communication system that can search for a distance and an azimuth direction (a reference literature of the UWB wireless, "UWB/Wireless USB textbook", written and edited by Shiro Sakata, publisher: Impress Communications Corporation").

The communication section 102 of the mobile terminal apparatus 101 illustrated in FIG. 1 is a built-in UWB communication section. However, in a case where the mobile terminal apparatus does not have a built-in UWB communication section, a UWB adapter 301 (which will be described later) illustrated in FIG. 3 can be attached to the mobile terminal apparatus so as to enable the mobile terminal apparatus 101 to employ the UWB communication.

The control section 103 controls each block of the mobile terminal apparatus 101. Further, the storage section 108 stores various data.

The display section 106 displays various information under the control of the control section 103 via the image output section 107.

Under the control of the control section 103, the image output section 107 causes the display section 106 to display image information received from the control section 103.

The input section 109 is an interface for a user input with respect to the mobile terminal apparatus. The input section 109 is constituted by a mouse, a keyboard, a touch panel, and the like. A user operates the input section 109 so as to operate the mobile terminal apparatus 101. At this point, the user can operate the input section 109 while viewing information displayed on the display section 106, for example. When a user inputs, via the input section 109, an inquiry for distance information and azimuth direction information of the plurality of display apparatuses 111, the control section 103 receives the input. The control section 103 controls the communication section 102 to send inquiry information that inquires for the distance information and azimuth direction information to the plurality of display apparatuses 111.

The communication section 102 sends the inquiry information to the plurality of display apparatuses 111 via the UWB wireless network 110. Further, the communication section 102 receives signals from the plurality of display apparatuses 111, and sends the signals to the storage section 108 via the control section 103.

The arithmetic section 104 calculates a distance between the mobile terminal apparatus 101 and each of the plurality of display apparatuses 111. The following describes an example of a method of calculating the distance. First, the storage section 108 stores: a time t1 at which the communication section 102 sent the inquiry information; and a time t2 at which the communication section 102 received a signal from each of the plurality of display apparatuses 111. The arithmetic section 104 receives information of each of t1 and t2, and calculates the distance between the mobile terminal apparatus 101 and each of the plurality of display apparatuses 111 by finding each time difference between t1 and t2.

Further, the arithmetic section 104 calculates an azimuth direction from the mobile terminal apparatus 101 toward each of the plurality of display apparatuses 111. The following describes an example of a method of calculating the azimuth direction. First, the communication section 102 includes an antenna 701 (which will be described later) illustrated in FIG. 7. If the antenna 701 is not a directional antenna, the azimuth direction with respect to each of the plurality of display apparatuses 111 is found by use of strength of a VSWR (Voltage Standing Wave Ratio) of a UWB radio wave from each of the plurality of display apparatuses 111. That is, the storage section 108 stores a radiating pattern A of the UWB radio wave sent from the antenna 701. The UWB radio wave from each of the plurality of display apparatuses 111 has been changed to a distorted radiating pattern B, which is a distorted radiating pattern A. The arithmetic section 104 receives information of the radiating pattern A and the distorted radiating pattern B. Then, the arithmetic section 104 compares the radiating pattern A with the distorted radiating pattern B and calculates an azimuth direction that has large distortion. Thus, the arithmetic section 104 calculates the azimuth direction with respect to each of the plurality of display apparatuses 111.

Further, if the communication section 102 has a directional antenna, it is possible to calculate an azimuth direction with respect to each of the plurality of display apparatuses 111 by attaching a required number of the antennas to the communication section 102.

The destination selecting section 105 selects the display apparatus 111 that is closest to the mobile terminal apparatus 101 among the plurality of display apparatuses 111 based on a result of the calculation carried out by the arithmetic section 104. Then, the destination selecting section 105 sends a result of the selection to the communication section 102 via the control section 103. The communication section 102 sends, to the closest display apparatus 111, a request signal for obtaining data from the display apparatus 111.

With the arrangement, the mobile terminal apparatus 101 can calculate the distance and azimuth direction with respect to each of the plurality of display apparatuses 111, and obtain required data from the display apparatus 111 that is closest to the mobile terminal apparatus 101 and has the azimuth direction calculated by the mobile terminal apparatus 101.

It is possible for the display section 106 to display the result calculated by the arithmetic section 104 in such a manner that the result is associated with each of the plurality of display apparatuses 111. This display may be, as described later, a graphic display, for example. Further, it is possible to have an arrangement in which, based on the display described above, a user can designate a particular display apparatus via the input section 109. In this case, when the input section 109 receives the user input that designates a particular display apparatus, the destination selecting section 105 selects the particular display apparatus 111 that is designated via the input section 109, and sends the result of the selection to the communication section 102 via the control section 103. With such an arrangement, a user can select not the display apparatus 111 closest to the mobile terminal apparatus 101 but the display apparatus 111 that is close to a user's destination, for example.

Figure 3:
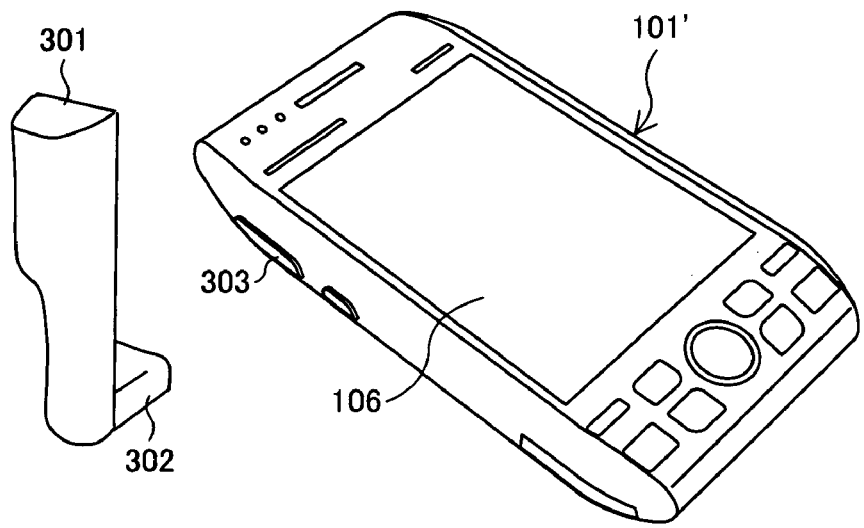
FIG. 3

FIG. 3 is a perspective view of a mobile terminal apparatus 101', which is another example of the mobile terminal apparatus in accordance with the present embodiment. The communication section 102 of the mobile terminal apparatus 101 described above is a UWB communication section. The mobile terminal apparatus 101' is the same in a basic arrangement as the mobile terminal apparatus 101, except that the mobile terminal apparatus 101' does not include a built-in UWB communication section. The mobile terminal apparatus 101' can be connected to a UWB adapter 301 via a USB port 303.

The USB adapter 301 includes a USB port connection section 302. By connecting the USB port connection section 302 to the USB port of the mobile terminal apparatus 101', it becomes possible for the mobile terminal apparatus 101', which does not include a built-in UWB communication section, to send/receive data via the UWB wireless network.

Figure 4:
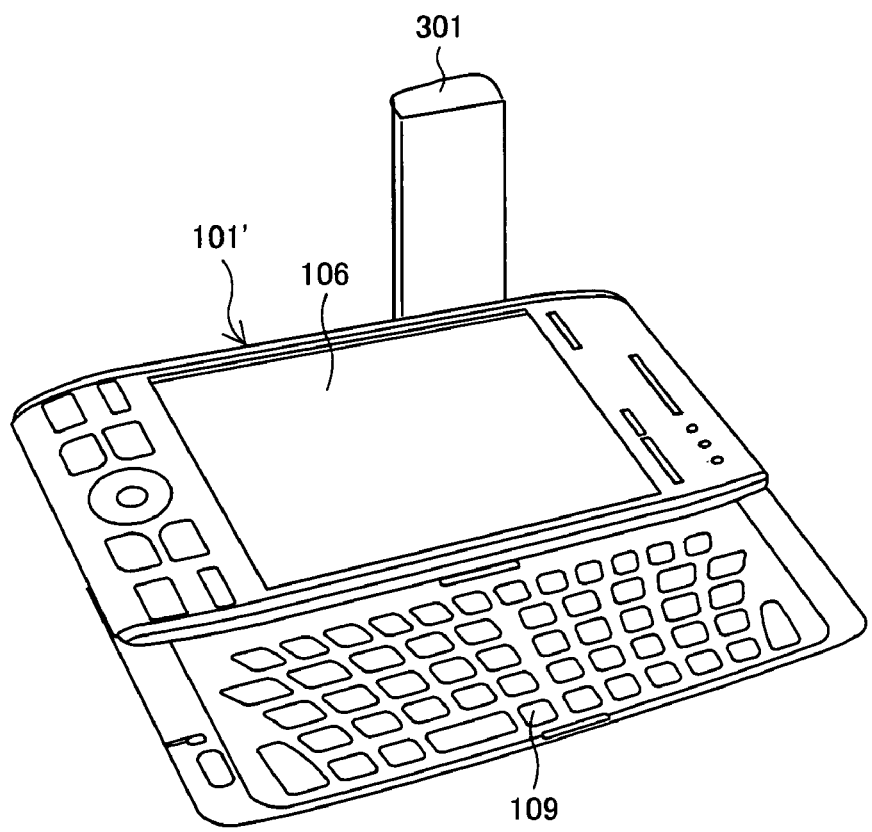
FIG. 4

FIG. 4 is a perspective view illustrating the mobile terminal apparatus 101' illustrated in FIG. 3 in a state where the display section 106 is slid to expose the input section 109 so that a user input can be carried out.

Figure 5:
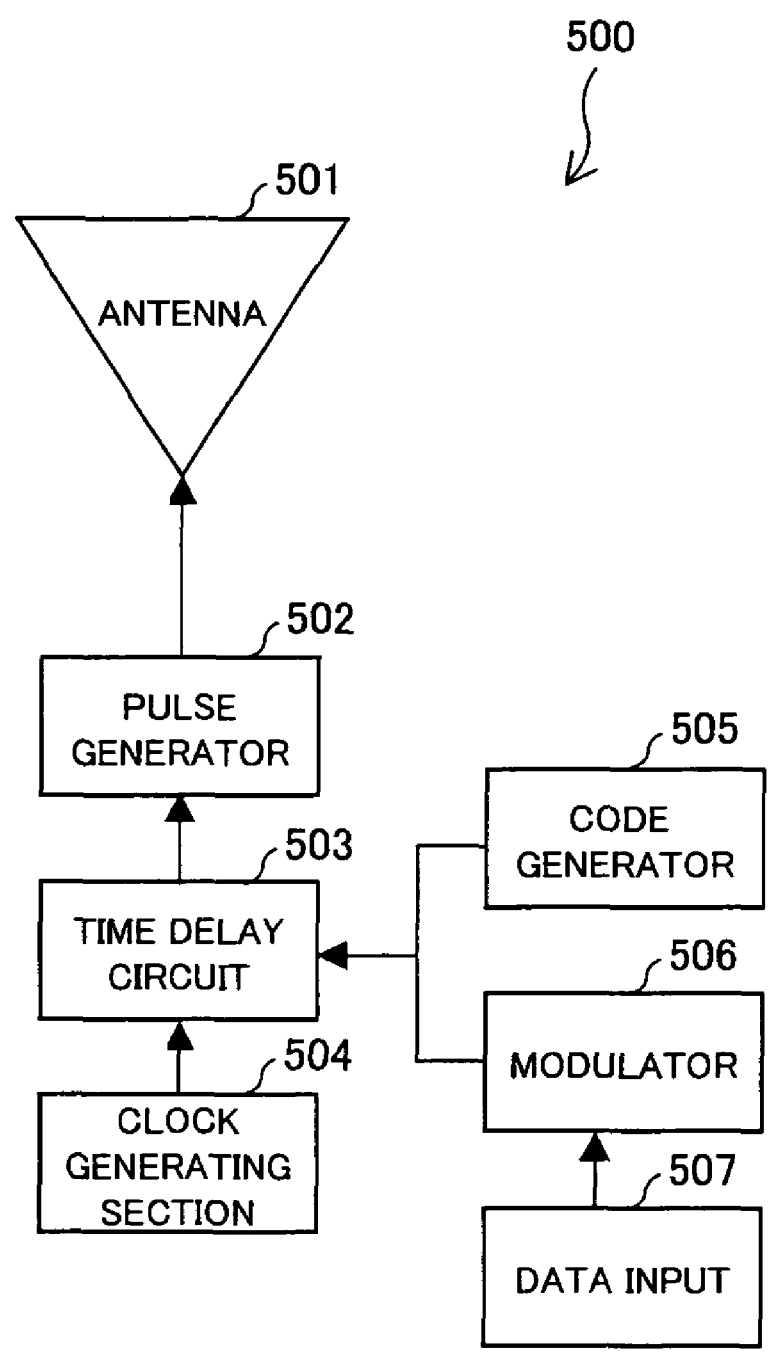
FIG. 5

Here, the following explains a UWB wireless transmitter, a UWB wireless receiver, and a UWB wireless transceiver. FIG. 5 is a block diagram of a UWB wireless transmitter 500. The UWB communication is a short-time pulse communication. For example, in a case where the mobile terminal apparatus 101 includes a built-in transmitter 500, the following processing is carried out. The information of the distance and azimuth direction with respect to the display apparatus 111 is inputted into a data input 507, and then is data-modulated in a modulator 506. After that, the information is combined with a signal generated from a code generator 505, and sent to a time-delay circuit 503. The signal sent to the time-delay circuit 503 is processed (the processing with respect to waveform-delay in a communication path, distortion resulted from the waveform-delay in a communication path, for example), and is sent to a pulse generator 502 with a clock signal generated by a clock generator 504. Then, an antenna 501 sends the signal in the form of a short-time pulse.

Figure 6:
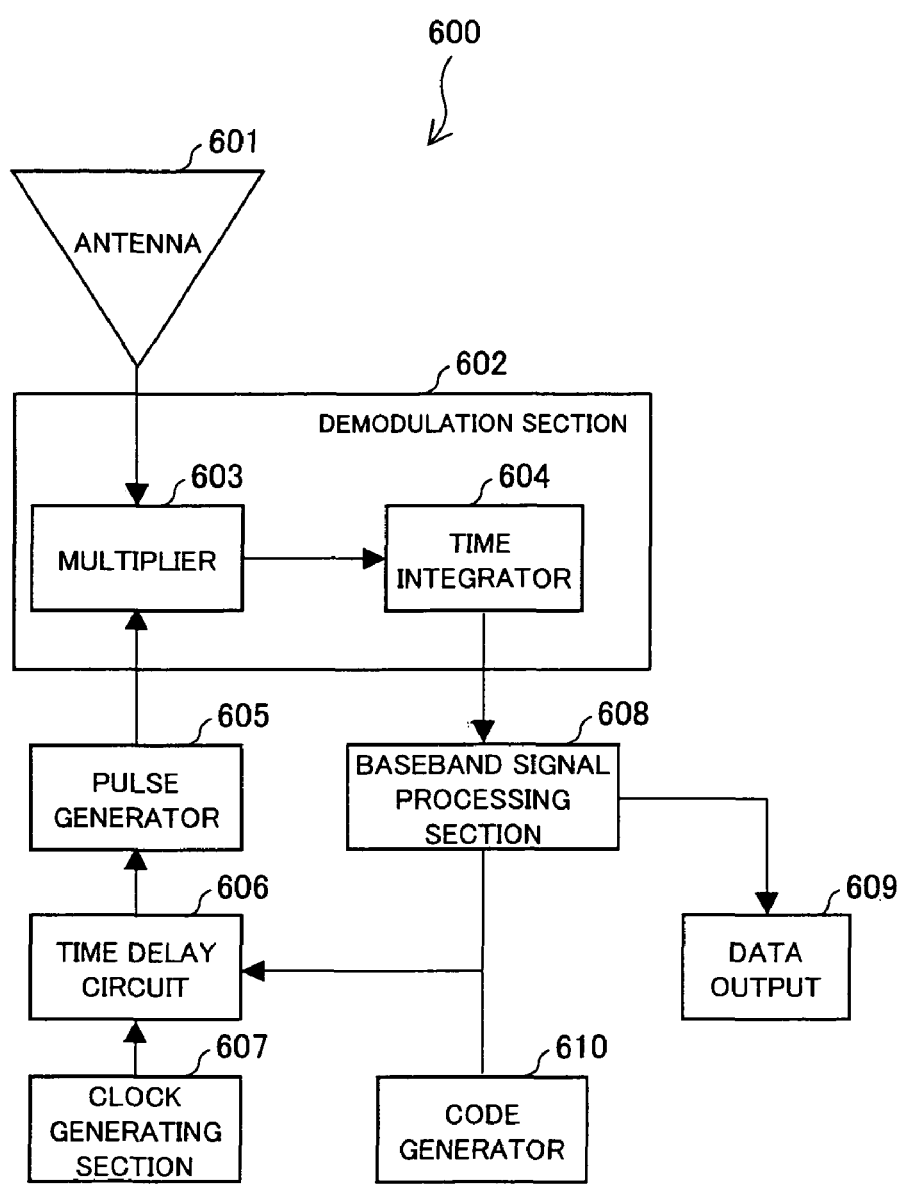
FIG. 6

FIG. 6 is a block diagram of a UWB communication receiver 600. An antenna 601 receives the short-time pulse from the antenna 501 illustrated in FIG. 5, and then a demodulation section 602 demodulates the short-time pulse. The demodulation is wave detection correlated with the received short-time pulse waveform. The demodulation section 602 is called "matched filter", and includes a multiplier 603 and a time integrator 604. The demodulated signal obtained via the multiplier 603 and the time integrator 604, is then signal-processed in a baseband signal processing section 608. After that, the signal is outputted from a data output 609 as an output signal.

Further, after being processed in the baseband signal processing section 608, the demodulated signal (the received signal thus demodulated) is combined with a signal from a code generator 610, and sent to a time-delay circuit 606. Furthermore, the demodulated signal is sent, with a clock signal from a clock generator 607, to the multiplier 603 via a pulse generator 605.

Thus, such a loop is formed that the signal from the baseband signal processing section 608 and the signal from the code generator 610 are combined with each other, sent to the time-delay circuit 606, and then sent, with the clock signal from the clock generator 607, to the multiplier 603 via the pulse generator 605.

The modulation and demodulation of the data may be: phase modulation in which a transmission time of the short-time pulse is phase-modulated on a time axis; position modulation in which a position is modulated; or amplitude modulation, for example.

Figure 7:
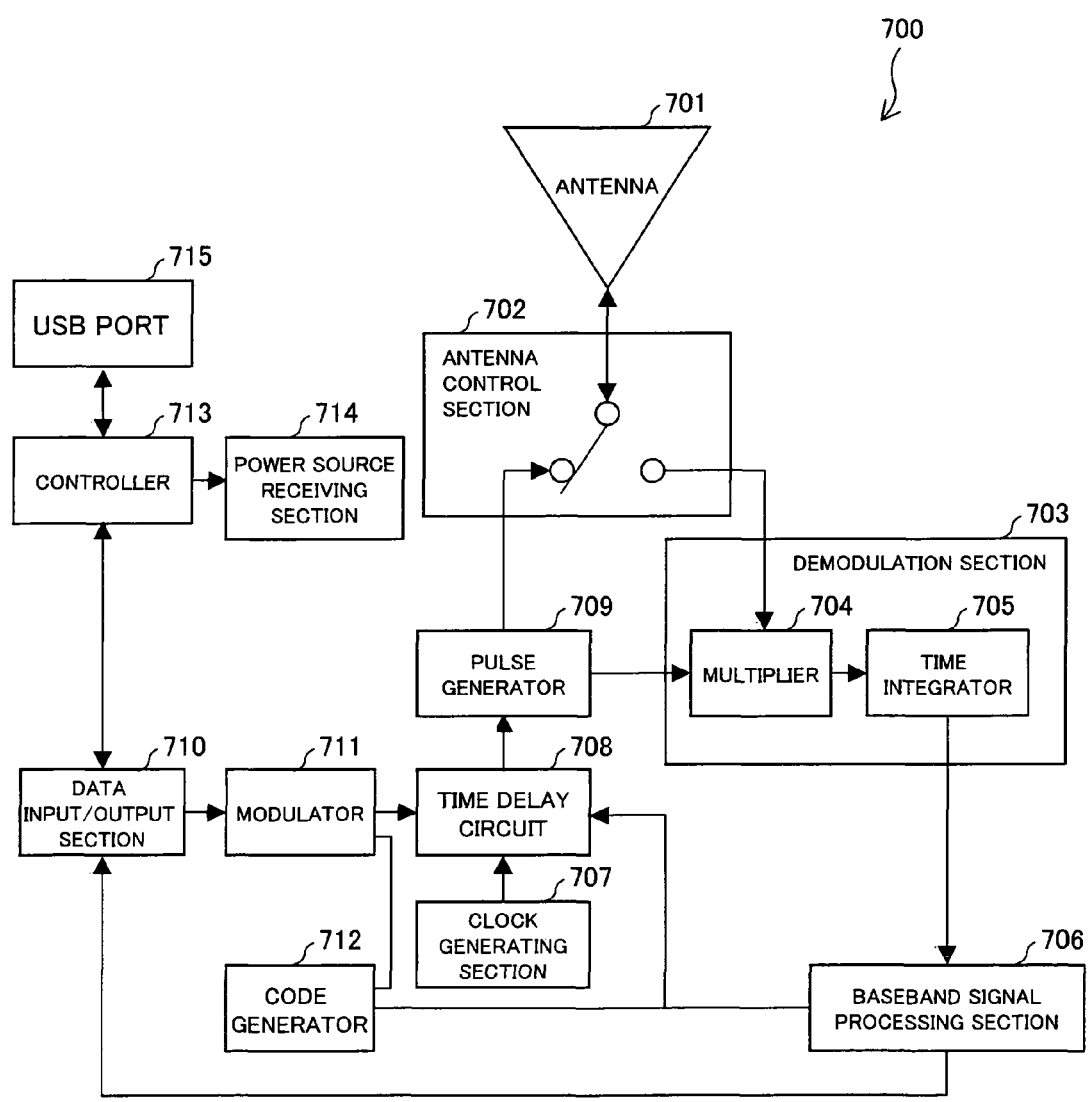
FIG. 7

Details of the antenna 601 are not illustrated in FIG. 6. However, the antenna 601 is preferably a miniaturized non-directional discone antenna. Moreover, in a case of a directional antenna, a required number of the antennas may be attached. FIG. 7 is a block diagram of a UWB transceiver 700. An antenna control section 702 allows the UWB transceiver 700 to send/receive the short-time pulse. An arrangement for sending/receiving the pulse is made by combining the UWB communication transmitter 500 illustrated in FIG. 5 and the UWB communication receiver 600 illustrated in FIG. 6 with each other.

Further, the UWB transceiver 700 can be connected to a USB port 715. This allows a display apparatus, a storage apparatus, a printing apparatus, or the like each of which does not have a built-in UWB transceiver, to have the UWB wireless communication.

Figure 2:
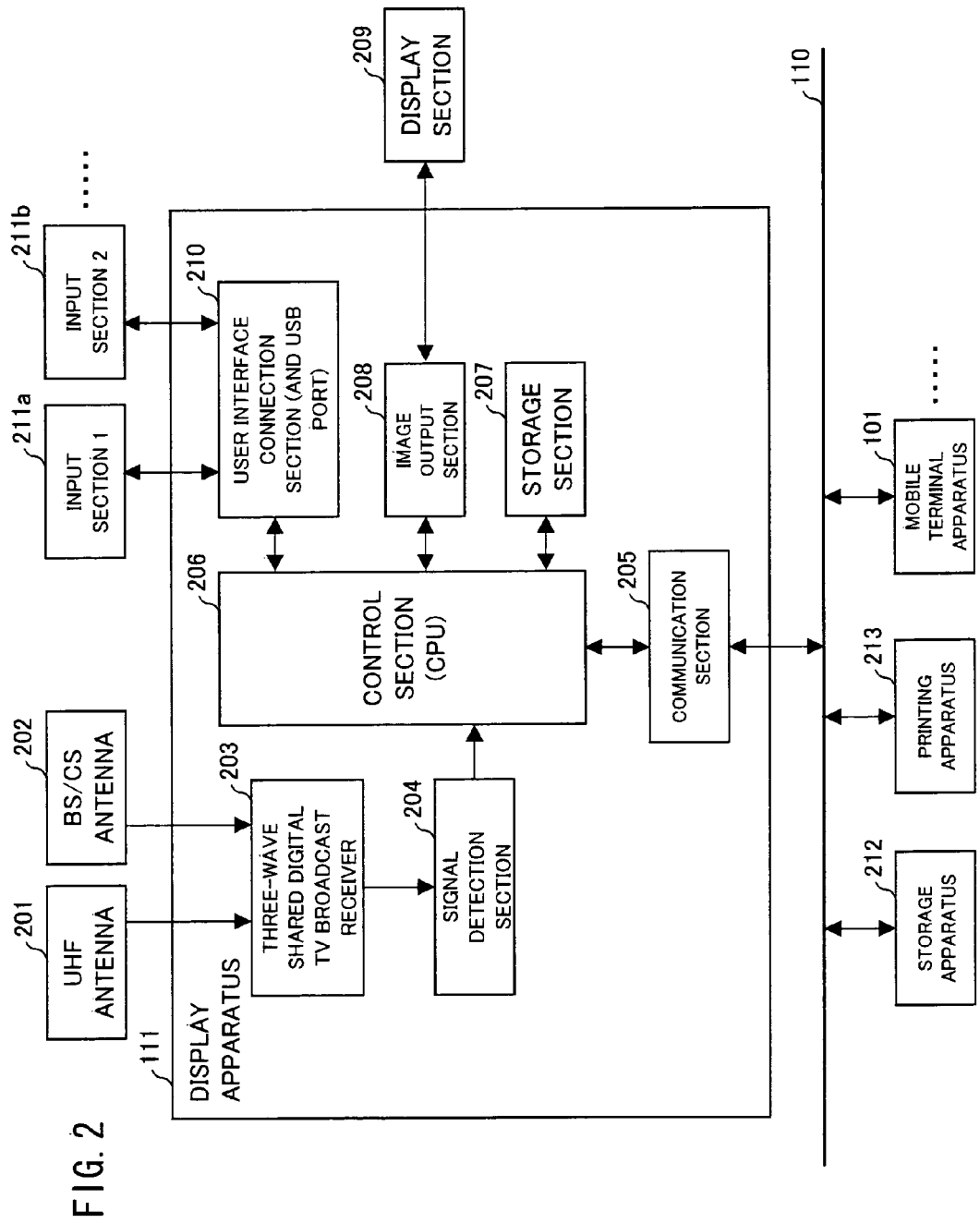
FIG. 2

Next, the following explains the display apparatus 111. FIG. 2 is a block diagram of the display apparatus 111. The display apparatus 111 is arranged to (i) read, at a request of the mobile terminal apparatus 101, evacuation route information corresponding to an installation site of the display apparatus 111 out of a storage apparatus 212 in which the evacuation route information is stored, and (ii) send the evacuation information to the mobile terminal apparatus 101. In the present embodiment, the display apparatus 111 is arranged to receive a request from the mobile terminal apparatus 101 and send the evacuation route information to the mobile terminal apparatus 101, as described above. However, it is possible to have another arrangement in which a storage apparatus 212 or a printing apparatus 213 (i) reads evacuation route information corresponding to its installation site out of a storage section in which the evacuation route information is stored, and (ii) sends the evacuation route information to the mobile terminal apparatus 101. In this case, the mobile terminal apparatus 101 obtains the evacuation route information from any one of the apparatuses (the display apparatus, the storage apparatus, and the printing apparatus), each of which can communicate with the mobile terminal apparatus 101, and is arranged to (i) read the evacuation route information corresponding to its installation site out of the storage section in which the evacuation route information is stored, and (ii) send the evacuation route information to the mobile terminal apparatus 101. Further, in the present embodiment, an electronic conference system according to the present invention is explained as a system including the display apparatus 111, as described below. However, the electronic conference system according to the present invention may include at least any one of the display apparatus, the storage apparatus, and the printing apparatus, each of which is an evacuation directive apparatus connected to a mobile terminal apparatus via a network, and includes a sending/receiving section that (i) reads evacuation route information corresponding to its installation site out of a storage section in a case of receiving request data from the mobile terminal apparatus 101, and (ii) sends the evacuation route information to the mobile terminal apparatus 101.

Here, the following explains the display apparatus 111 as an apparatus used in a conference taken place in a conference room. Further, the display apparatus 111 is arranged such that, when detecting emergency information, the display apparatus 111 (i) stores, in the storage apparatus 212, conference proceedings data outputted on a display section 209, (ii) reads, out of the storage apparatus 212, instructions in the event of an emergency situation, an evacuation route map used in the event of an emergency situation, and the like, and (iii) displays and prints out the instructions, the evacuation route map and the like. The emergency information is information on an emergency situation, and hereinafter is explained as an earthquake early warning or an emergency warning broadcast. Further, hereinafter, a time when a signal of the earthquake early warning is detected (the earthquake early warning is received) is referred to as "in the event that an earthquake early warning is broadcasted", and a time when an emergency warning broadcast identifier is detected (the emergency warning broadcast is received) is referred to as "in the event that an emergency warning is broadcasted".

The display apparatus 111 includes: a three-wave shared digital TV broadcast receiver 203 connected to a UHF antenna 201 and a BS/CS antenna 202; and a signal detection section (emergency signal detection section) 204. The display apparatus 111 is connected to the display section 209. However, the display apparatus 111 may include a UHF antenna digital terrestrial broadcast receiver or a BS/CS antenna digital terrestrial broadcast receiver, in place of the three-wave shared digital TV broadcast receiver 203. Further, it is possible to provide the three-wave shared digital TV broadcast receiver 203 and the signal detection section 204 separate from the display apparatus 111.

The three-wave shared digital TV broadcast receiver 203 receives a signal from a TV broadcast station via the UHF antenna 201 or the BS/CS antenna 202, and the signal thus received is sent to a control section 206 via the signal detection section 204.

The signal detection section 204 detects the signal received by the three-wave shared digital TV broadcast receiver 203. The signal detection section 204 is also arranged to detect signals of the earthquake early warning and the emergency warning broadcast identifier.

The display section 209 displays various information under the control of the control section 206 via an image output section 208. Under the control of the control section 206, the image output section 208 causes the display section 209 to display image information received from the control section 206. A storage section 207 stores various data.

A user interface connection section 210 receives a user input with respect to the display apparatus 111 from an input section 211*a*, an input section 211*b*, etc. Further, the user interface connection section 210 includes a USB port.

The signal detection section 204 and the image output section 208 are connected to the control section 206, and the image output section 208 is connected to the display section 209. Further, the control section 206 is connected to both of the storage apparatus 212 and the printing apparatus 213 via a communication section 205. The communication section 205 is connected to both of the storage apparatus 212 and the printing apparatus 213 via the UWB wireless network 110. That is, the communication section 205 is a built-in UWB communication section. However, in a case where the display apparatus does not have a built-in UWB communication section, said UWB adapter 301 can be attached to the display apparatus so as to enable the display apparatus to have the UWB communication, for example.

The display apparatus 111 may employ a wired communication, such as a LAN cable (not illustrated), a Fast Ethernet (Registered Trademark), a Gigabit Ethernet, a USB 2.0, and a USB 3.0, and may employ the Internet.

Moreover, the display apparatus 111 includes a touch panel (not illustrated). A user can input coordinates by using a touch pen so as to input figures, letters, symbols, and/or the like while changing a thickness and a color of a line thereof, as appropriate.

In the storage apparatus 212, conference proceedings data and evacuation information are stored. The evacuation information contains (i) instructions in the event that an earthquake early warning is broadcasted, (ii) an evacuation route map used in the event that an earthquake early warning is broadcasted, (iii) instructions in the event that an emergency warning is broadcasted, and (iv) an evacuation route map used in the event that an emergency warning is broadcasted (described later). The evacuation information is customized in accordance with an installation site (in this case, a building having the conference room) of the display apparatus 111. The evacuation route map (small-scale map) is a map on which premises of the building, evacuation sites in a whole area, and the like are shown, for example.

Further, in the storage apparatus 212, a detailed evacuation route map (evacuation route information, a large-scale map) is stored. The display apparatus 111 reads, out of the storage apparatus 212, the detailed evacuation route map at a request of the mobile terminal apparatus 101. The detailed evacuation route map is customized in accordance with the installation site (in this case, the conference room) of the display apparatus 111. For example, the detailed evacuation route map is customized in accordance with a position of the conference room in the building, the environment surrounding the building having the conference room, a premises condition of the building, and/or the like. The detailed evacuation route map is a map more detailed than said evacuation route map. The small-scale map is a large area map including regional evacuation sites such as a school and a park, and the large-scale map deals with, for example, the inside of a single building. The single building may be a building owned by a company, a commercial building for rent, or a hotel, for example. The large-scale map may be any map as long as it is a detailed map containing confidential information.

Furthermore, in the present embodiment, the storage apparatus 212 writes information on a Blu-ray disc (storage medium), and reads information out of a Blu-ray disc.

Figure 10:
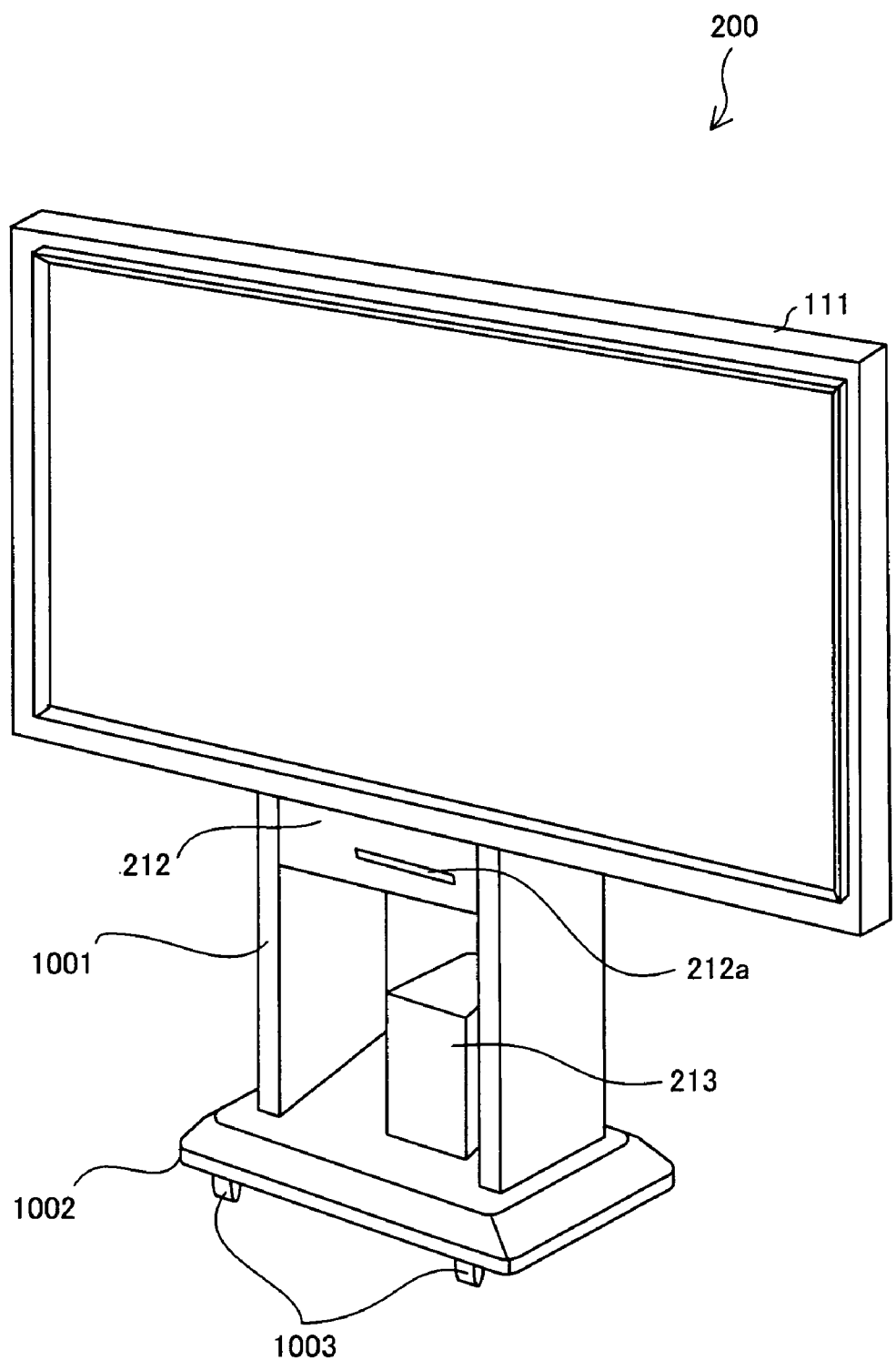
FIG. 10

In the present embodiment, each of the plurality of display apparatuses 111 is connected to a storage apparatus 212 and a printing apparatus 213 independently. FIG. 10 illustrates an example of an electronic conference system 200 in which the display apparatus 111 is connected to the storage apparatus 212 and the printing apparatus 213, as described above. The storage apparatus 212 is provided with a storage medium removable tray 212*a*. Further, the electronic conference system 200 may include a leg section 1001, a base 1002, and wheels 1003.

Figure 9:
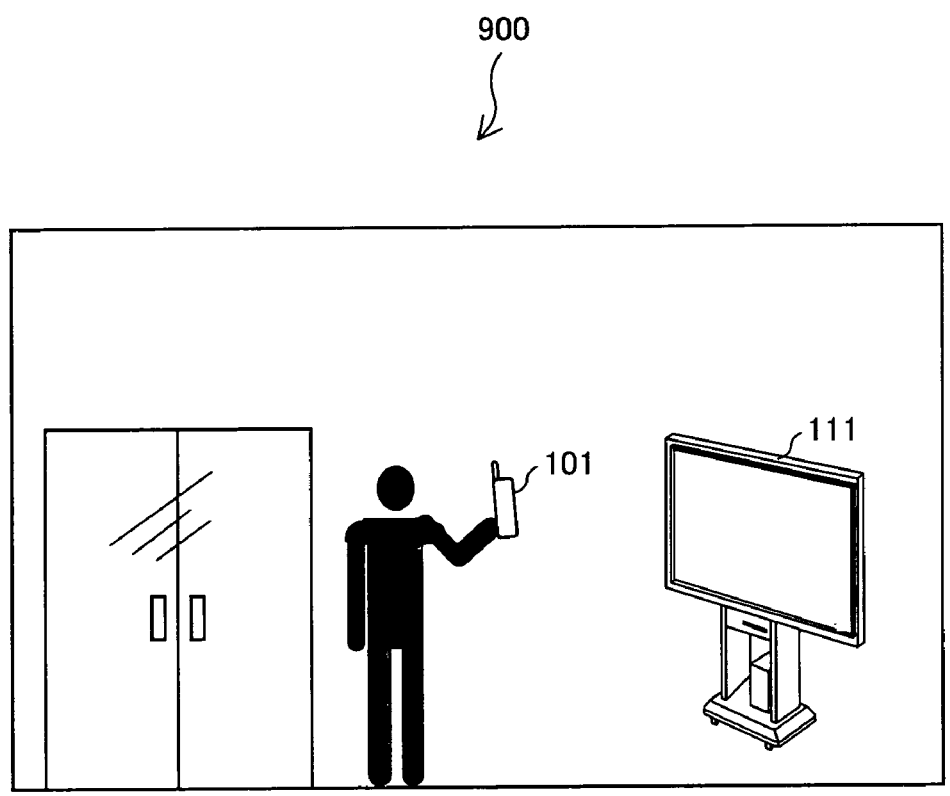
FIG. 9

FIG. 9 illustrates an example of a conference room 900 in which the display apparatus 111 is installed. In the present embodiment, the plurality of display apparatuses 111 are installed in separate conference rooms (places) respectively, and are connected to the storage apparatuses 212 and the printing apparatuses 213 respectively and independently. However, for example, in a case where the plurality of display apparatuses 111 are installed in a single conference room (in the vicinity), the display apparatuses 111 thus installed may share the storage apparatus 212 and the printing apparatus 213. In this case, too, another display apparatus 111 installed in another conference room (away from said conference room) is connected to another storage apparatus 212 and another printing apparatus 213, both of which are installed in said another conference room.

When a power source (not illustrated) of the display apparatus 111 is turned on, both of the three-wave shared digital TV broadcast receiver 203 and the signal detection section 204 become simultaneously ready for operation. Further, it is preferable that power sources of the storage apparatus 212 and the printing apparatus 213 are simultaneously turned on, and become ready for operation, when the power source (not illustrated) of the display apparatus 111 is turned on. However, the present invention is not limited to this, and it is possible to turn on each apparatus in order to cause each apparatus to be ready for operation independently.

In the present embodiment, a setting defined as a read-out mode setting is a series of processing from storing conference proceedings data in the storage apparatus 212 to reading, out of the storage apparatus 212, the instructions in the event that an earthquake early warning is broadcasted and the evacuation route map used in the event that an earthquake early warning is broadcasted, or the instructions in the event that an emergency warning is broadcasted and the evacuation route map used in the event that an emergency warning is broadcasted. The read-out mode setting is arranged to be turned on automatically at the time the power source (not illustrated) of the display apparatus 111 is turned on. The read-out mode setting is arranged such that a user can cancel (turn off) the read-out mode setting by selecting an icon or the like (not illustrated) on the display section 209 with the use of an input apparatus (not illustrated) such as a touch pen. Further, it is also possible for an operator to turn on the read-out mode setting by selecting an icon or the like (not illustrated) on the display section 209 with the use of an input apparatus (not illustrated) such as the touch pen.

In the above description, a series of processing from storing the conference proceedings data in the storage apparatus 212 to reading, out of the storage apparatus 212, the instructions in the event that an earthquake early warning is broadcasted and the evacuation route map used in the event that an earthquake early warning is broadcasted, or the instructions in the event that an emergency warning is broadcasted and the evacuation route map used in the event that an emergency warning is broadcasted is defined as the read-out mode setting. However, it is also possible to (i) define the processing of storing the conference proceedings data in the storage apparatus 212 as a first mode, and define the processing of reading, out of the storage apparatus 212, the instructions in the event that an earthquake early warning is broadcasted and the evacuation route map used in the event that an earthquake early warning is broadcasted, or the instructions in the event that an emergency warning is broadcasted and the evacuation route map used in the event that an emergency warning is broadcasted, as a second mode, and (ii) set (turn on/off) the modes separately.

Here, conference proceedings and the like are displayed on the display section 209, for example. While a user (not illustrated) writes diagrams, characters, symbols, and the like with the use of a touch pen, the conference proceeds, for example. Then, in a state where the read-out mode setting is on, the three-wave shared digital TV broadcast receiver 203 receives, from a digital TV broadcast station (not illustrated) via the UHF antenna 201 or the BS/CS antenna 202, a signal including information of the earthquake early warning or the emergency warning broadcast, for example. In this case, the signal detection section 204 detects a signal of the earthquake early warning or an emergency warning broadcast identifier, and sends a signal indicating the detection to the control section 206. Further, the signal of the information of the earthquake early warning or the emergency warning broadcast (received by the three-wave shared digital TV broadcast receiver 203) is sent to the control section 206 via the signal detection section 204.

The control section 206 receives the signal from the signal detection section 204, and sends, to the display section 209 via the image output section 208, video data (which may include character data) included in the information of the earthquake early warning or the information of the emergency warning broadcast. Then, the control section 206 controls the display of the display section 209. Further, the control section 206 sends, to an audio output apparatus (not illustrated), audio data included in the information of the earthquake early warning or the information of the emergency warning broadcast, and controls an audio output.

Figure 11:
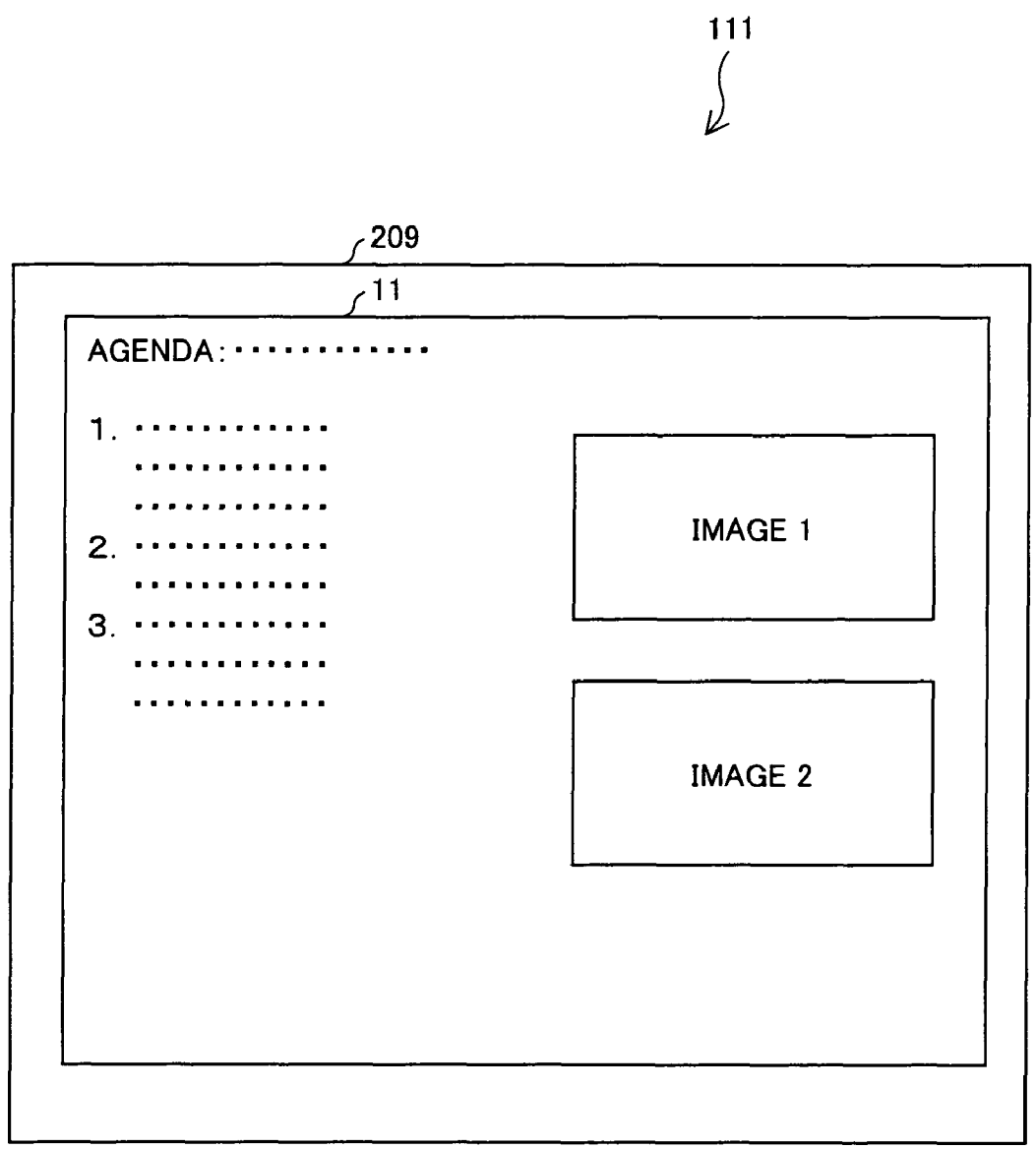
FIG. 11

Furthermore, the control section 206 causes the storage apparatus 212 to store conference proceedings data 11 displayed on the display section 209 (illustrated in FIG. 11). Additionally, when receiving an earthquake early warning, the control section 206 reads, out of the storage apparatus 212, the evacuation information including the instructions in the event that an earthquake early warning is broadcasted and the evacuation route map used in the event that an earthquake early warning is broadcasted. When receiving an emergency warning broadcast, the control section 206 reads, out of the storage apparatus 212, the evacuation information including the instructions in the event that an emergency warning is broadcasted and the evacuation route map used in the event that an emergency warning is broadcasted. Such evacuation information includes video data, audio data, and print data. The evacuation information is customized in accordance with the installation site of the display apparatus 111, as described above. Here, in a case where the storage apparatus 212 stores the conference proceedings data 11, the conference proceedings data 11 is stored on a second information storage layer 1405, which is a RE layer of a Blu-ray disc (storage medium) 1400 illustrated in (a) of FIG. 14 and (b) of FIG. 14. Further, in a case where the evacuation information is read out of the storage apparatus 212, the evacuation information is read out of a first information storage layer 1403, which is a ROM layer of the Blu-ray disc 1400.

Furthermore, the control section 206 causes the display section 209 to display the video data of the evacuation information, and causes the audio output apparatus (not illustrated) to output the audio data of the evacuation information. Moreover, the control section 206 sends the print data of the evacuation information to the printing apparatus 213 so as to cause the printing apparatus 213 to print out the print data. The control section 206 is connected to an image capturing apparatus (not illustrated) which can obtain image data by capturing an image of the conference room in which the display apparatus 111 is installed. The control section 206 may count how many conference participants (users) are included in the image data, and provide the counted number as the number of sheet(s) on which the print data will be printed out. Then, the number of the sheet(s) is sent to the printing apparatus 213 so that the print data is printed out for each of the conference participants. Thus, the printed matter can be given out to each of the conference participants.

Figure 12:
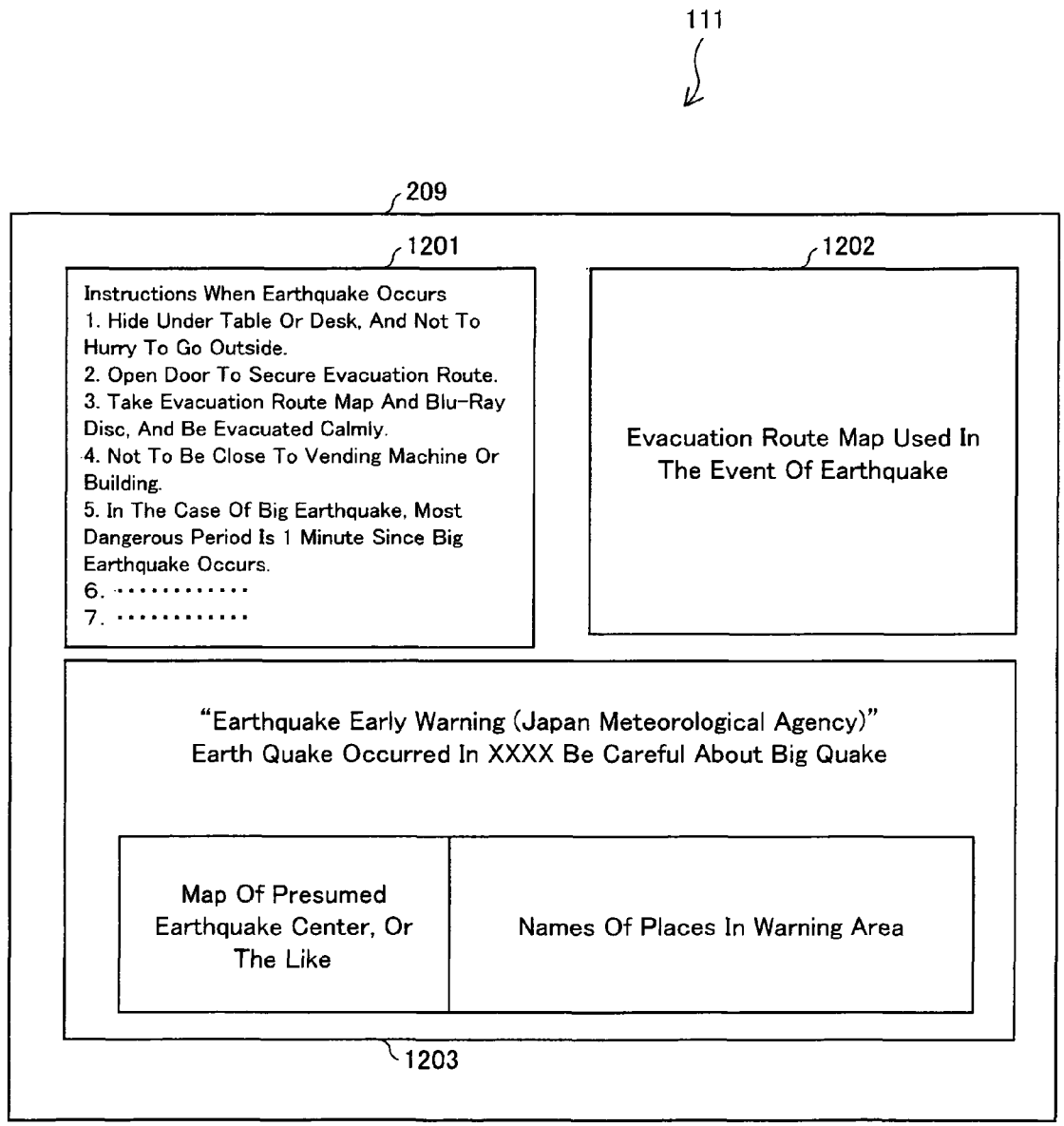
FIG. 12

FIG. 12 illustrates an example of a display of the display section 209 at the time the signal detection section 204 detects the signal of the earthquake early warning. In this case, an upper half of the display section 209 displays (i) instructions 1201 in the event of an earthquake, titled "INSTRUCTIONS WHEN EARTHQUAKE OCCURS", and (ii) an evacuation route map 1202 used in the event of an earthquake. A lower half of the display section 209 displays video data 1203 of the earthquake early warning. Further, audio data corresponding to the instructions 1201 in the event of an earthquake is outputted, and print data of the instructions 1201 in the event of an earthquake and print data of the evacuation route map 1202 used in the event of an earthquake are printed out.

Figure 13:
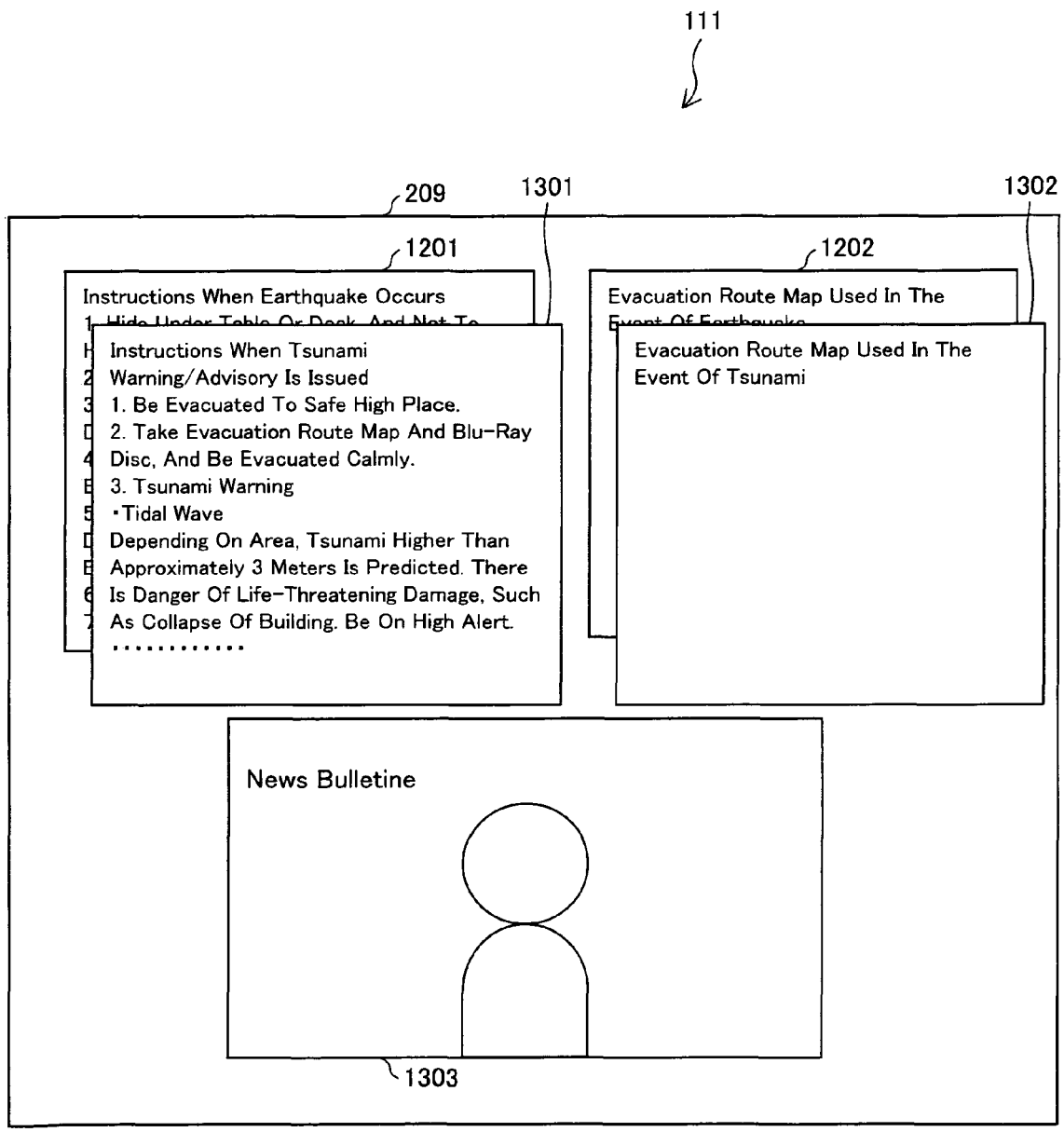
FIG. 13

FIG. 13 illustrates an example of a display of the display section 209 at the time the signal detection section 204 detects an emergency warning broadcast identifier. In this case, the upper half of the display section 209 displays (i) the instructions 1201 in the event of an earthquake, titled "INSTRUCTIONS WHEN EARTHQUAKE OCCURS", and (ii) instructions 1301 in the event that a tsunami warning/advisory is issued, titled "INSTRUCTIONS WHEN TSUNAMI WARNING/ADVISORY IS ISSUED", again and again. Here, these instructions and are displayed alternatively, however, all of them may be displayed simultaneously. Further, (i) the evacuation route map 1202 used in the event of an earthquake and (ii) an evacuation route map 1302 used in the event of a tsunami are also displayed in the upper half of the display section 209 again and again. Here, these maps are displayed alternatively, however, both of the maps may be displayed simultaneously. The lower half of the display section 209 displays video data 1303 of the emergency warning broadcast. At this point, audio data of each of the instructions is outputted, and (i) print data of the instructions 1201 in the event of an earthquake, (ii) print data of the evacuation route map 1202 used in the event of an earthquake, (iii) print data of the instructions 1301 in the event that a tsunami warning/advisory is issued, and (iv) print data of the evacuation route map 1302 used in the event of a tsunami is issued are printed out.

Figure 8:
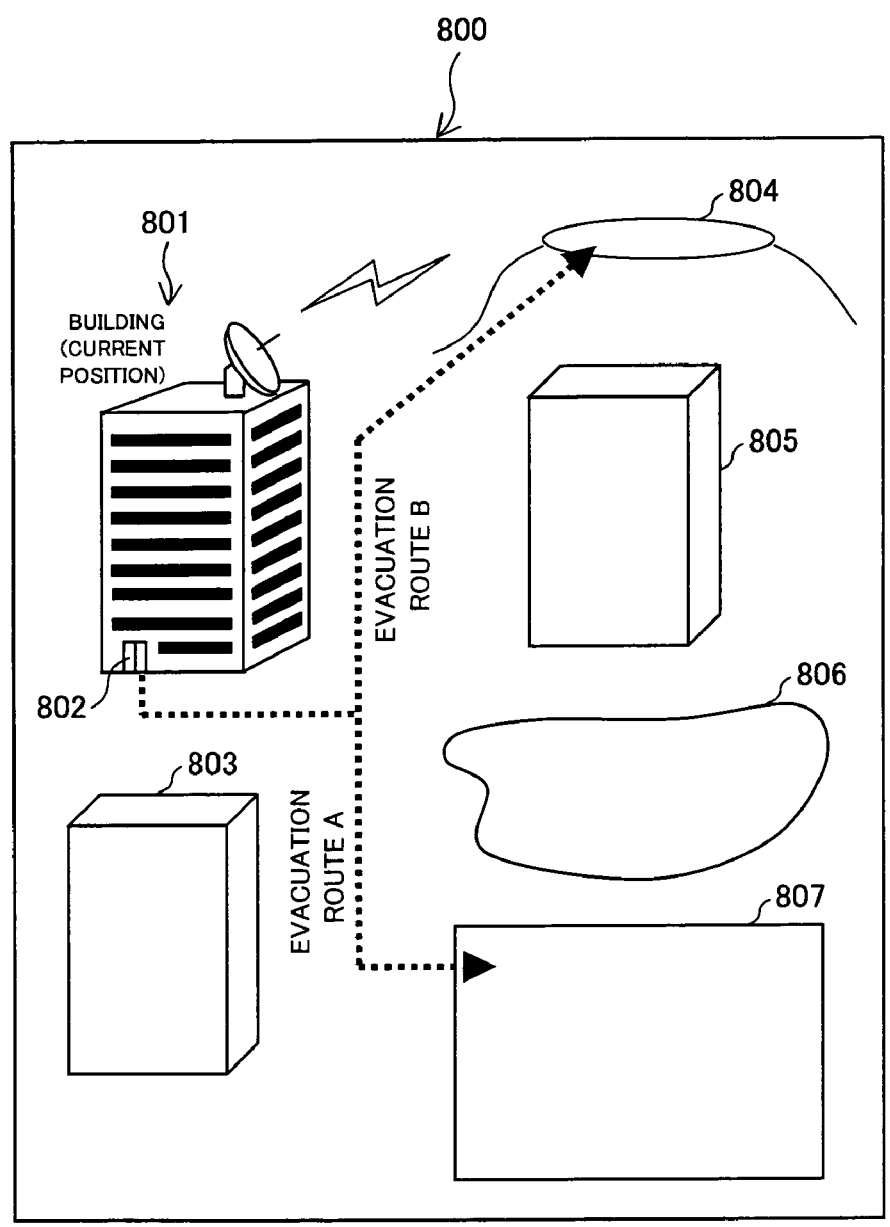
FIG. 8

Here, FIG. 8 illustrates an example of an evacuation route map. The plurality of display apparatuses 111 are installed, respectively, in conference rooms of a nine-story building 801 (architectural structure), for example. A user is in a conference room of the building 801, for example. An evacuation route map 800 shows an evacuation route in premises of the building 801. On the evacuation route, there are a second building 803, a third building 805, and a pond (water for fire protection) 806. It should be noted that there is the sea (not illustrated though) on a lower side of FIG. 8. When an earthquake early warning is broadcasted, the evacuation route map 800 is displayed and printed out such that, for example, an evacuation route A is represented in a full line so as to evacuate the user along the evacuation route A from a user's current position, which is a doorway 802 of the building 801, to an evacuation site 807, which is a playing field. Further, if there is a danger of a tsunami at the time that an emergency warning is broadcasted, the evacuation route map 800 is displayed and printed out such that, for example, an evacuation route B is represented in a dotted line so as to evacuate the user along the evacuation route B from the user's current position, which is the doorway 802 of the building 801, to a high place 804.

Next, the following explains an example of a Blu-ray disc used in the storage apparatus 212. (a) of FIG. 14 is a schematic view of a Blu-ray disc 1400, and (b) of FIG. 14 is a cross-sectional view of the Blu-ray disc 1400. As illustrated in (b) of FIG. 14, the Blu-ray disc 1400 has an arrangement in which, in the order of being farther away from a reproduction light incidence plane side, a light-transmitting layer 1402, a first information storage layer 1403, an intermediate layer 1404, a second information storage layer 1405, and a substrate 1406 are laminated. For reproduction light with respect to the Blu-ray disc 1400, a blue-violet laser (a wavelength of approximately 405 nm), which is within a blue visible region, is employed. The first information storage layer 1403 is a ROM layer. The second information storage layer 1405 is a RE layer, which is constituted by a thin film (seven layers 1405a to 1405g) in the present embodiment.

FIG. 15 shows attributes of information which is to be stored on the Blu-ray disc 1400. As illustrated in FIG. 15, various programs for causing the storage apparatus 212 to perform various operations are stored in the first information storage layer (read-only ROM layer). The first information storage layer may be a write-once storage layer (R layer), on which the writing is performable only once. Further, content is also stored in the first information storage layer. In the present embodiment, the content is various data (video data, audio data, and print data) of (i) the customized instructions in the event that an earthquake early warning is broadcasted, (ii) the customized evacuation route map (small-scale map) used in the event that an earthquake early warning is broadcasted, (iii) the customized instructions in the event that an emergency warning is broadcasted, and (iv) the customized evacuation route map (small-scale map) in the event that an emergency warning is broadcasted. Furthermore, detailed evacuation route maps (large-scale maps, not illustrated) are stored in the first information storage layer (read-only ROM layer), as well.

On the second information storage layer (rewritable RE layer), conference proceedings data displayed on the display section 209 can be recorded and stored.

With the display apparatus 111, the storage apparatus 212, and the printing apparatus 213, arranged as described above, conference participants (users) can obtain each of the instructions and evacuation route maps in the forms of image and sound, while viewing and listening to an earthquake early warning or an emergency warning broadcast in real time. Further, when being evacuated, the conference participants (users) can carry documents (printed matters) on which each of the instructions and evacuation route maps is printed. Here, each of the instructions and evacuation route maps is customized in accordance with the installation site of the display apparatus 111. Therefore, since the conference participants (users) can carry the printed matters of the evacuation information customized in accordance with the installation site of the display apparatus 111 at the time of the evacuation, they can be evacuated without losing their way or getting into a panic in an emergency situation. Moreover, when being evacuated, the users can carry the Blu-ray disc on which the conference proceedings data is stored. Thus, it becomes possible for all of the users to be evacuated from the conference room safely.

Next, the following explains a method in which, the conference participants (users) obtain a detailed evacuation route map by searching for the display apparatus 111 that is closest to them among the plurality of display apparatuses in a case where they are being evacuated and find an evacuation route becomes unavailable.

In order that the conference participants (users) search for the closest display apparatus 111 on the mobile terminal apparatus 101 carried by the conference participants, a network connection screen 1600 illustrated in FIG. 16 is displayed on the display section 106 of the mobile terminal apparatus 101, for example. The network connection screen 1600 is arranged so as to be displayed by controlling the input section 109 of the mobile terminal apparatus 101. When a user touches a pointer or a touch panel (not illustrated) to select a UWB connection 1602, the display section 106 displays a property screen 1700 (illustrated in FIG. 17) of the UWB connection.

In the property screen 1700 (illustrated in FIG. 17) of the UWB connection, a connection method column 1701 indicates Ultra-wideband (UWB) is set as a connection method. Further, in an item-in-use column 1702, check boxes for "Client for XXXXnetwork" and "File and Printer Sharing for XXXXnetwork" are checked. Furthermore, an explanation column 1703 indicates it is possible for a computer (mobile terminal apparatus 101) to be connected to the UWB network. Moreover, by checking a check box 1704 for always accessing an apparatus closest to the mobile terminal apparatus 101 among the plurality of apparatuses, and a check box 1705 for allowing a reconnection and then a re-implementation in a case where the access is interrupted, the following advantages can be achieved, for example. After a signal is sent to the display apparatus 111 that is closest to the mobile terminal apparatus 101 carried by the user, the user moves and the display apparatus 111 closest to the mobile terminal apparatus 101 is switched over to another display apparatus 111, for example. In this case, it is possible to automatically re-send the signal to the display apparatus 111 that becomes newly closest to a user's current position. At this time, the signal received from the computer (mobile terminal apparatus 101) is added with specific information of the computer (mobile terminal apparatus 101), such as an ID number and an IP address. The ID number, the ID address, and the like of the computer (mobile terminal apparatus 101) have been registered in the display apparatus 111 in advance so that the computer is allowed to communicate with the display apparatus 111 via the UWB communication. The display apparatus 111 is set to allow only the computer (mobile terminal apparatus 101) thus registered to mutually communicate with the display apparatus 111.

Further, if the user selects a UWB area detection display button 1706 on the property screen 1700 (illustrated in FIG. 17) of the UWB connection by touching the pointer or the touch panel (not illustrated), a UWB detection screen illustrated in FIG. 18 is displayed on the display section 106, for example.

The UWB detection screen 1800 illustrated in FIG. 18 is a graphic display screen representing distances and azimuth directions between the mobile terminal apparatus 101, which is represented in the center of the screen, and the plurality of display apparatuses 111. In this example, there are three display apparatuses that can communicate with the mobile terminal apparatus 101, namely display apparatuses 111A, 111B, and 111C. Positions of the display apparatuses 111A, 111B, and 111C on the UWB detection screen are based on the result of the calculation carried out by the arithmetic section 104.

The UWB detection screen 1800 illustrated in FIG. 18 shows that (i) the display apparatus 111A is closest to the mobile terminal apparatus 101, (ii) a distance between the display apparatus 111A and the mobile terminal apparatus 101 is approximately 5 m, and (iii) an azimuth direction from the mobile terminal apparatus 101 with respect to the display apparatus 111A is southeast.

At this point, in a case where the destination selecting section 105 automatically selects the closest display apparatus 111A based on the result of the calculation carried out by the arithmetic section 104, the communication section 102 sends, to the closest display apparatus 111A, a request signal (detailed map acquisition request signal) for obtaining a detailed evacuation route map. On the other hand, in a case of an arrangement in which the user can designate a particular display apparatus, the processing will be as described below. If the user selects the display apparatus 111A on the UWB detection screen 1800 illustrated in FIG. 18 via the input section 109 (here, the pointer or the touch panel, (not illustrated)), the display apparatus 111A on the screen is graphic-displayed (displayed in the same color as the mobile terminal apparatus 101, for example) so as to show that the user designated the display apparatus 111A. If the user thus designates the particular display apparatus (here, the display apparatus 111A), and then pushes (touches) an information acquisition button 1805 displayed on the UWB detection screen 1800, the destination selecting section 105 selects the display apparatus 111A, and the communication section 102 sends the detailed map acquisition request signal to the display apparatus 111A. A UWB area detection information button 1801 on the UWB detection screen 1800 is a button for accepting a user input for searching for the plurality of display apparatuses 111 that are in the UWB wireless network 110. If the user moves to another place and wants to re-search for the plurality of display apparatuses, this button is used.

When receiving the detailed map acquisition request signal, the display apparatus 111A sends a detailed evacuation route map that is read out of the storage apparatus 212 to the user's mobile terminal apparatus 101. At this time, the signal received from the computer (mobile terminal apparatus 101) is added with the specific information of the computer (mobile terminal apparatus 101), such as the ID number and the ID address. The ID number, the ID address and the like of the computer (mobile terminal apparatus 101) have been registered in the display apparatus 111 in advance so that the computer is allowed to communicate with the display apparatus 111 via the UWB communication. The display apparatus 111 is set to allow only the computer (mobile terminal apparatus 101) thus registered in advance to mutually communicate with the display apparatus 111.

Next, FIG. 19 illustrates an example of a detailed evacuation route map 1902 that is received from the closest display apparatus 111A and displayed on the display section 106 of the mobile terminal apparatus 101 carried by the user who are being evacuated. The user is planning to escape through a northwest staircase, but finds a destination 1903 is unavailable, for example. Here, in FIG. 19, a mark "x", where the destination 1903 is unavailable, merely represents a position of the destination 1903 for an easier explanation, and is not shown on the detailed evacuation route map obtained from the display apparatus 111A. Further, the mobile terminal apparatus 101 illustrated in FIG. 19 merely represents a user's position for an easier explanation, and is also not shown on the detailed evacuation route map obtained from the display apparatus 111A.

The detailed evacuation route map 1902 illustrated in FIG. 19 shows that there are a west emergency exit stairway (evacuation route A), an east emergency exit stairway (evacuation route B), and a southeast stairway (evacuation route C). This allows the user carrying the mobile terminal apparatus 101 to newly select one of the evacuation routes A, B, and C to escape. A UWB area detection information button 1901 on the display section 106 illustrated in FIG. 19 is a button for accepting the user input for searching for the plurality of display apparatuses 111 that are in the UWB wireless network 110. If the user moves to another place and wants to re-search for the plurality of display apparatuses 111, this button is used. Further, an information acquisition button 1904 is a button for accepting the user input for sending, to the closest display apparatus 111, a request signal for obtaining the detailed evacuation route map.

Next, the following explains processing of the display apparatus 111 in the evacuation route obtaining system 100 with reference to a flow chart of FIG. 20.

First, in a step S1, the three-wave shared digital TV broadcast receiver 203 receives, via the UHF antenna 201 or the BS/CS antenna 202 from a digital terrestrial TV broadcast station, a digital signal including an earthquake early warning or an emergency warning broadcast. Next, in a step S2, the signal detection section 204 detects a signal of the earthquake early warning or a signal of the emergency warning broadcast identifier from the digital signal (which was received by the three-wave shared digital TV broadcast receiver 203) that includes the earthquake early warning or the emergency warning broadcast. Then, the signal detection section 204 sends, to the control section 206, (i) a signal indicating that the signal detection section 204 has detected said signal, and (ii) output data (video data including character data, audio data, and the like) of the earthquake early warning or output data of the emergency warning broadcast.

Then, the control section 206 receives the signal indicating that the signal detection section 204 has detected the signal of the earthquake early warning or the signal of the emergency warning broadcast identifier, and also receives, via the signal detection section 204, the output data of the earthquake early warning or the output data of the emergency warning broadcast. In a step S3, it is determined whether or not the read-out mode setting is on.

If it is determined, in the step S3, that the read-out mode setting is on, the processing proceeds to a step S4. In the step S4, the conference proceedings data is stored in the storage apparatus, and video data, audio data, and print data each of which relates to (i) the instructions in the event that an earthquake early warning is broadcasted, and (ii) the evacuation route map used in the event that an earthquake early warning is broadcasted, or video data, audio data, and print data each of which relates to (i) the instructions in the event that an emergency warning is broadcasted, and (ii) the evacuation route map used in the event that an emergency warning is broadcasted are read out of the storage apparatus. More specifically, the conference proceedings data displayed on the display section 209 is stored on the second information storage layer 1405 of the Blu-ray disc 1400 in the storage apparatus 212. Then, in a case where the earthquake early warning is received, video data, audio data, and print data (hereinafter, collectively referred to as "data read out in the event that an earthquake early warning is broadcasted") of (i) instructions in the event of an earthquake, (ii) an evacuation route map used in the event of an earthquake, and (iii) the like are read out of the first information storage layer 1403 of the Blu-ray disc 1400 in the storage apparatus 212. In a case where an emergency warning broadcast is received, video data, audio data, and print data (hereinafter, collectively referred to as "data read out in the event that an emergency warning is broadcasted") of (i) instructions in the event that an emergency warning is broadcasted, (ii) an evacuation route map used in the event that an emergency warning is broadcasted, and (iii) the like are read out. The instructions in the event that an emergency warning is broadcasted include (i) the instructions in the event of an earthquake, and (ii) the instructions in the event that a tsunami warning/advisory is issued. There is a case where merely either one of the instructions is read out in accordance with the emergency warning broadcast. Further, the evacuation route map in the event that an emergency warning is broadcasted includes (i) the evacuation route map in the event of an earthquake and (ii) the evacuation route map in the event of a tsunami. There is a case where either one of the maps is read out in accordance with the emergency warning broadcast. Then, the processing proceeds to a step S5.

In the step S5, the video data, the audio data, and the print data each of which relates to (i) the earthquake early warning, (ii) the instructions in the event of an earthquake early warning is broadcasted, and (iii) the evacuation route map used in the event that an earthquake early warning is broadcasted, or the video data, the audio data, and the print data each of which relates to (i) the emergency warning broadcast, (ii) the instructions in the event that an emergency warning is broadcasted, and (iii) the evacuation route map used in the event that an emergency warning is broadcasted, are processed as described below. Each of the video data is sent to the display section, and the display control is carried out. Further, each of the audio data is sent to the audio output apparatus, and the audio output control is carried out. Furthermore, each of the print data is sent to the printing apparatus, and the print control is carried out. More specifically, the display section 209 displays (i) the video data (including character data) concerning the received earthquake early warning and (ii) video data included in the data read out in the event that an earthquake early warning is broadcasted (read out of the storage apparatus 212) or (i) the video data concerning the received emergency warning broadcast and (ii) video data included in the data read out in the event that an emergency warning is broadcasted (read out of the storage apparatus 212).

The audio output apparatus (not illustrated) outputs (i) the audio data of the earthquake early warning and (ii) audio data included in the data read out in the event that an earthquake early warning is broadcasted (read out of the storage apparatus 212), or (i) the audio data of the emergency warning broadcast and (ii) audio data included in the data read out in the event that an emergency warning is broadcasted (read out of the storage apparatus 212). Further, print data included in the data read out in the event that an earthquake early warning is broadcasted (read out of the storage apparatus 212), or print data included in the data read out in the event that an emergency warning is broadcasted (read out of the storage apparatus 212) is sent to the printing apparatus 213 so as to cause the printing apparatus 213 to print out the print data.

If the read-out mode setting is off in the step S3, the processing proceeds to a step S6, and the display section 209 continues to display the conference proceedings data.

Next, the following explains processing of the mobile terminal apparatus 101 in the evacuation route obtaining system 100 with reference to a flow chart of FIG. 21.

First, in a step 11, when the input section 109 receives an input from a user (not illustrated), the communication section 102 sends, via the control section 103, a search signal to each of the plurality of display apparatuses 111 that are in the UWB wireless network 110. Next, in a step S12, the communication section 102 receives a reply signal from each of the plurality of display apparatuses 111. Then, in a step S13, the arithmetic section 104 calculates distance information and azimuth direction information with respect to each of the plurality of display apparatuses 111 based on the reply signal received from each of the plurality of display apparatuses 111. Further, in a step S14, the destination selecting section 105 selects, based on a result of the determination in the step S13, the display apparatus 111 that is closest to the mobile terminal apparatus 101 among the plurality of display apparatuses 111.

Then, in a step S15, it is determined whether to send, to the display apparatus 111 selected in the step S14, a detailed map acquisition request signal for obtaining the detailed evacuation route map. Here, the display section 106 displays a screen for requiring the user to decide whether to send said request signal. If the mobile terminal apparatus 101 receives the user input instructing the mobile terminal apparatus 101 to send the detailed map acquisition request signal to the selected display apparatus 111 (the user decides to send the detailed map acquisition request signal, that is, "Yes" in the step S15), the processing proceeds to a step S16. Then, the mobile terminal apparatus 101 finishes the processing by obtaining the detailed evacuation route map from the closest display apparatus 111 (END). It is possible to proceed to the step S16 without requiring the user to make a decision in the step S15. In the step S16, the mobile terminal apparatus 101 sends the request signal for obtaining the detailed evacuation route map to the closest display apparatus 111.

However, if the user further moves to another place, for example, and decides not to send the detailed map acquisition request signal (that is, "No" in the step S15), the processing proceeds to a step S17. In the step S17, it is determined that the display apparatus 111 is re-searched. Then, the processing goes back to the step S11. After the processing goes back to the step S11, the communication section 102 sends the search signal again to each of the plurality of display apparatuses 111 that are in the UWB wireless network, and the processing described above is repeated.

In the present embodiment described above, a distance between the mobile terminal apparatus 101 carried by the user and each of the plurality of display apparatuses 111, and an azimuth direction from the mobile terminal apparatus 101 with respect to each of the plurality of display apparatuses 111 are calculated. Further, along with a movement of the mobile terminal apparatus 101, the detailed evacuation route map is obtained from the display apparatus 111 that is closest to the mobile terminal apparatus 101 among the plurality of display apparatuses 111. However, it is possible to have another arrangement in which, along with the movement of the mobile terminal apparatus 101, each of the plurality of display apparatuses 111 calculates the distance information and azimuth direction information with respect to the mobile terminal apparatus 101, and the display apparatus 111 that is closest to the mobile terminal apparatus 101 sends the detailed evacuation route map to the mobile terminal apparatus 101.

Further, in the explanations of the present embodiment described above, the UWB wireless network employs an impulse system. However, the UWB wireless network may employ a DS-UWB system in which a band of 3.1 GHz to 10.6 GHz is used in such a manner that the band is divided into a low band and a high band, and a band for an 802.11a wireless LAN is avoided, or an MB-OFDM system in which a band of 3.1 GHz to 10.6 GHz is divided into 14 bands by 528 MHz.

Unlike a GPS, the UWB wireless network is advantageous in that a wireless radar function can be used even in a closed environment. Furthermore, since the UWB wireless network can simultaneously provide a high-speed data communication function and the wireless radar function, it is believed that the UWB wireless network is the best high-performance wireless network compared with other wireless networks.

Moreover, in the present embodiment described above, the evacuation route obtaining system including the mobile terminal apparatus 101 and the display apparatus 111 is explained as an example. However, as the mobile terminal apparatus 101, a portable digital TV having the UWB wireless, digital audio equipment having the UWB wireless, or a digital image capturing device having the UWB wireless may be used, for example. Further, as the display section of the display apparatus 111, a liquid crystal display, a plasma display (Plasma Display Panel), an SED (Surface-conduction Electron-emitter Display), FED (Field Emission Display), an organic electro-luminescence display, a PTA display (Plasma Tube Array Display), a rear projection display, or an electronic paper display may be used, for example. Furthermore, as a matter of course, the present invention can be modified and realized by arbitrarily associating consumer devices (a digital storage device, for example), in-car devices (a portable navigation device, for example), and the like with each other. As the display section 106 of the mobile terminal apparatus 101, a liquid crystal display, a plasma display, an SED, an FED, an organic EL display, a PTA display, an electronic paper display, or the like may be used.

Furthermore, the present embodiment described above explains, as an example, a case where disaster information (an earthquake early warning, an emergency warning broadcast, and the like) is detected from the digital terrestrial broadcasting or the digital BS/CS broadcasting. However, the disaster information differs depending on a country or a region, as a matter of course. Accordingly, the disaster information includes any disaster information regarding not only an earthquake and a tsunami but also any natural disasters and any man-made disasters, such as a tornado, a hurricane, a typhoon, a volcano, a fire, a fall of a rocket, a fall of a satellite, and a fall of a meteorite. Moreover, the disaster information may be related not to a disaster but to any information, as long as the information is emergency information, such as information related to: terrorism; a crime; and an incident. Further, the disaster information may be included not in the broadcasts described above but in another broadcast. That is, the present invention can be applied to a case where a user goes to a strange land, a strange area, or a strange country, and information for evacuating the user safely without suffering from a natural disaster or a man-made disaster is broadcasted.

Further, in the explanations of the present embodiment described above, an information output apparatus according to the present invention is used in a conference room. However, the information output apparatus according to the present invention can be used in any situations where people gather around, such as various event sites, an event at a hotel, a photo studio, a strategy meeting for a sport, a medical related place, mass media (a TV broadcast station or a publisher, for example), and an amusement facility.

Furthermore, each block of the mobile terminal apparatus 101 and the display apparatus 111, especially the control section 103, the arithmetic section 104, the destination selecting section 105, the signal detection section 204, the control section 206, can be arranged by a hardware logic, or can be realized by software with the use of a CPU.

In other words, each of the mobile terminal apparatus 101 and the display apparatus 111 includes: a CPU (central processing unit) for executing instructions from a control program that realizes each of the functions; a ROM (read only memory) in which the program is stored; a RAM (random access memory) for operating the program; a storage apparatus (storage medium) such as a memory in which the program and various data are stored; and the like. An object of the present invention can be also achieved in such a manner that (i) each of the mobile terminal apparatus 101 and the display apparatus 111 is provided with a computer-readable storage medium in which program codes (executable program, intermediate code program, source program) of the control program (which is software for realizing the functions described above) of the mobile terminal apparatus 101 or the display apparatus 111 are stored, and (ii) the computers (alternatively a CPU or an MPU) of the mobile terminal apparatus 101 and the display apparatuses 111 read out and execute the program codes respectively.

Further, it is possible to have an arrangement in which the mobile terminal apparatus 101, the display apparatus 111, the storage apparatus 212, and the printing apparatus 213 are connected to a communication network, and provided with the program codes via the communication network. The communication network is not particularly limited, and may be the Internet, an intranet, an extranet, a LAN, an ISDN, a VAN, a CATV communication network, a virtual private network, a phone-line network, a mobile communication network, ((WiMAX (IEEE 802.16-2004, IEEE 802.16e, IEEE 802.16a, IEEE 802.16h, or the like)), a satellite communication network, an optical wireless network (including an LED optical wireless network), or the like. Furthermore, a transmission medium constituting the communication network is not particularly limited, and may be a closed-circuit, such as IEEE 1394, a USB, a power-line carrier, a cable TV circuit, a phone line, and an ADSL circuit, or a wireless medium, such as infrared radiation (IrDA or a remote control, for example), Bluetooth (Registered Trademark), an 802.11 wireless LAN, an HDR, a mobile phone network, a satellite circuit, and a digital terrestrial wave network. The present invention can be also realized by the program codes in the form of a computer data signal embedded in a carrier wave, which is the program that is electrically transmitted.

In order to attain the object, an evacuation route obtaining system of the present invention includes: a mobile terminal apparatus; and a plurality of evacuation directive apparatuses being connected with the mobile terminal apparatus via a network, wherein: each of the plurality of evacuation directive apparatuses includes a sending/receiving section which, when receiving request data from the mobile terminal apparatus, (i) reads, out of a storage section, evacuation route information corresponding to an installation site of the evacuation directive apparatus, and (ii) sends the evacuation route information to the mobile terminal apparatus; and the mobile terminal apparatus includes: an arithmetic section for calculating a positional relationship between the mobile terminal apparatus and each of the plurality of evacuation directive apparatuses; a destination selecting section for selecting a particular evacuation directive apparatus from among the plurality of evacuation directive apparatuses based on a result of the calculation carried out by the arithmetic section; a data communication section for (i) sending the request data to the particular evacuation directive apparatus selected by the destination selecting section, and (ii) receiving the evacuation route information read out by the particular evacuation directive apparatus; and a display section for displaying the evacuation route information received by the data communication section.

With the system described above, the particular evacuation directive apparatus is selected on the mobile terminal apparatus based on the result of calculating the positional relationship between the mobile terminal apparatus and each of the plurality of evacuation directive apparatuses, and then the evacuation route information is obtained from the particular evacuation directive apparatus, after that the evacuation route information is displayed. The evacuation route information corresponds to the installation site of the evacuation directive apparatus from which the evacuation route information has been obtained. Accordingly, it is possible that, in a case where a user is being evacuated while carrying the mobile terminal apparatus, the user obtains, from the particular evacuation route information (the closest evacuation directive apparatus, or an evacuation directive apparatus at a user's destination), evacuation route information corresponding to the installation site of the particular evacuation directive apparatus (that is, an evacuation route information in accordance with a position of the user who is being evacuated), and displays the evacuation route information.

Thus, with the evacuation route obtaining system according to the present invention, it is possible to (i) provide a user with easy operation procedures, (ii) successfully provide the user with evacuation route information suitable for a real-time situation in an evacuation, and (iii) evacuate and guide the user safely and securely while making the user feel secure.

Each of the plurality of evacuation directive apparatuses may be a display apparatus connected to the mobile terminal apparatus via a first network, and the storage section may be a storage medium included in a storage apparatus that is connected to each of the plurality of display apparatuses via a second network.

In the evacuation route obtaining system of the present invention, in addition to the arrangements described above, the mobile terminal apparatus may further include an input section for accepting an input from a user, the display section displaying information created based on the result of the calculation carried out by the arithmetic section, which information indicates the positional relationship between each of the plurality of evacuation directive apparatuses and the mobile terminal apparatus; the input section may accept an input that designates a particular evacuation directive apparatus; and the destination selecting section may select the particular evacuation directive apparatus that is designated by the input accepted by the input section.

With the system described above, it is possible for a user to (i) view such a display that the result of the calculation carried out by the arithmetic section is associated with each of the plurality of evacuation directive apparatuses, and (ii) designate the particular evacuation directive apparatus. Then, the particular evacuation directive apparatus is selected as the destination to which the request data for the evacuation route information is sent. Therefore, it is possible to select the evacuation directive apparatus from which the evacuation route information corresponding to a real-time situation of the user is obtained. This makes the system more convenient.

In the evacuation route obtaining system of the present invention, in addition to the arrangements described above, the storage section may store therein evacuation information associated with emergency information for an emergency situation, and used in an evacuation from the installation site of the evacuation directive apparatus; each of the plurality of evacuation directive apparatuses may further include: an information display section; an emergency signal detection section for detecting a signal of the emergency information; a printing apparatus; and a control section which, when the emergency signal detection section detects the signal of the emergency information, (i) causes the storage section to store display information that is displayed on the information display section at the time that the signal is detected, (ii) reads the evacuation information out of the storage section, (iii) causes the information display section to display the evacuation information and the emergency information, and (iv) causes the printing apparatus to print out the evacuation information.

With the system described above, when the signal of the emergency information is detected, (i) the storage section stored the display information displayed on the information display section of the evacuation directive apparatus at the time of the detection, (ii) the information display section of the evacuation directive apparatus displays the emergency information and the evacuation information that is associated with the emergency information and used in the evacuation from the installation site of the evacuation directive apparatus, and (iii) the printing apparatus prints out the evacuation information. Therefore, when the signal of the emergency information is detected, the user, who is in a place where the display apparatus is installed, can detect the emergency information displayed on the information display section of the evacuation directive apparatus, and then can check the evacuation information, after that can be evacuated. Further, the evacuation information is printed out so that the user can be evacuated while carrying the printed matter. Here, the evacuation information is the information used in the evacuation from the installation site of the evacuation directive apparatus. That is, the evacuation information is customized in accordance with the installation site of the evacuation directive apparatus. The user is evacuated while carrying the printed matter of the evacuation information that has been customized in accordance with the installation site of the evacuation directive apparatus, so that the user can be evacuated in an emergency situation without losing his/her way or getting into a panic. Thus, with the evacuation route obtaining system of the present invention, it is possible to appropriately evacuate a user who is in a place where an evacuation directive apparatus is installed. The evacuation information may be any information as long as it is information useful for an evacuation from an installation site of the evacuation directive apparatus. For example, the evacuation information may be information indicating an evacuation route, or information of instructions that are necessary for an evacuation.

In the evacuation route obtaining system of the present invention, in addition to the arrangements described above, the evacuation information may include at least one of small-scale evacuation route information that is smaller in scale than the evacuation route information, and information of instructions for an emergency situation.

With the system described above, the small-scale evacuation route information that is smaller in scale than the evacuation route information is displayed on the information display section of the evacuation directive apparatus, and is also printed out. Therefore, the user can be evacuated while viewing the evacuation route that is smaller in scale than the evacuation route information. The evacuation route information is larger in scale than the small-scale evacuation route. Therefore, the user can be evacuated while checking the printed matter on which the small-scale evacuation route is printed, and checking the mobile terminal apparatus for more detailed map corresponding to a user's current position. This allows a user to easily find an evacuation site and to be evacuated safely and successfully. Thus, with the evacuation route obtaining system of the present invention, it is possible to guide and evacuate a user more appropriately when a disaster occurs. Further, the evacuation information may include information of instructions in the event of a disaster. By causing the evacuation information to include the instructions in the event of a disaster, it becomes possible to allow a user to be appropriately evacuated without getting into a panic in a disaster.

In the evacuation route obtaining system of the present invention, in addition to the arrangements described above, each of the plurality of evacuation directive apparatuses may further include an audio output apparatus; and the evacuation information may include audio information; and the control section may read out the audio information included in the evacuation information and cause the audio output apparatus to output the audio information if the emergency signal detection section detects the signal of the emergency information.

With the system described above, the audio information included in the evacuation information is outputted, so that it becomes possible to appropriately evacuate a user with the audio information in addition to the display information and the print information.

In the evacuation route obtaining system of the present invention, in addition to the arrangements described above, the storage section may be a removable storage medium in which the evacuation route information the evacuation information are stored, and the storage section may further store the display information.

With the system described above, when the emergency information is received, a user can take the storage medium (storage section) out of the evacuation directive apparatus and can be evacuated with the storage medium (storage section). Accordingly, if the evacuation directive apparatus is completely broken in a disaster, and cannot be repaired, for example, the user can keep the display information displayed at the time. Thus, in a case where the display apparatus is used to display conference proceedings, for example, the conference proceedings information cannot be lost, and the conference can be resumed smoothly. That is, the previous conference or the like cannot be wasted.

Further, even if the conference proceedings data contains a full high definition image (an image of approximately 2.07 million pixels, 1920 pixel long×1080 pixel wide, for example), it is possible to store the image clearly and vividly, and then read out the image. Furthermore, even if a user fails to take the storage medium out of the storage apparatus in an evacuation, it is possible for the user who is being evacuated to obtain the conference proceedings data by searching for, on the mobile terminal apparatus, the display apparatus or the storage apparatus that was used in the conference.

Here, the storage medium is a medium whose information recording and information reading are carried out by use of a laser beam. Further, the storage medium may include a read-only ROM layer on which the evacuation route information and the evacuation information have been stored, or a write-once storage layer on which writing is performable only once.

In the evacuation route obtaining system of the present invention, in addition to the arrangements described above, each of the plurality of evacuation directive apparatuses may be connected to an image capturing apparatus, for obtaining image data by capturing an image of the installation site of the evacuation directive apparatus, and the control section may count how many people are included in the image data and controls the printing apparatus to print out the evacuation information on sheet(s) as many as the count of the people.

With the system described above, the evacuation information is printed in such a manner that (i) the image capturing apparatus obtains image data by capturing an image of the installation site of the evacuation directive apparatus, and (ii) the evacuation information is printed on the sheet(s) as many as the number of people included in the image data. Therefore, the printed matters can be given out to each of the users who are in the installation place of the evacuation directive apparatus, and each of the users can be evacuated while carrying the printed matter on which the evacuation information is printed.

In the evacuation route obtaining system of the present invention, in addition to the arrangements described above, a first network connects the mobile terminal apparatus to each of the plurality of display apparatuses; and in a case where the storage section is a storage medium included in a storage apparatus connected to each of the plurality of display apparatuses via a second network, the first network may directly connect the mobile terminal apparatus to each of the plurality of display apparatuses, and the second network directly connects the plurality of display apparatuses respectively to the storage apparatus corresponding thereto.

With the arrangement described above, the first network directly connects the mobile terminal apparatus to each of the plurality of display apparatuses. Further, the second network directly connects each of the plurality of display apparatuses to the storage apparatus corresponding thereto. Accordingly the system does not need a base station. Therefore, even if a system of the base station is down due to a disaster, it is possible to obtain the evacuation information from the display apparatus. Thus, the mobile terminal apparatus does not need a constant communication base station, and can provide a stable communication at any time. Therefore, a user can obtain a desired evacuation route immediately.

In the evacuation route obtaining system of the present invention, in addition to the arrangements described above, the first network may be a UWB wireless network. In a case where the first network is the UWB wireless network, it becomes possible to send/receive large volumes of data at a high speed, and also to search for a distance and an azimuth direction. In this case, the mobile terminal apparatus and each of the plurality of display apparatuses have a UWB wireless interface respectively, or are provided with a UWB wireless adapter respectively. Further, in this case, as the positional relationship, the arithmetic section may calculate azimuth directions from the mobile terminal apparatus with respect to the plurality of display apparatuses based on distortion differences between radiation patterns of UWB wireless radio waves sent to the plurality of display apparatuses and radiation patterns of UWB wireless radio waves received from the plurality of display apparatuses. Furthermore, in this case, as the positional relationship, the arithmetic section may calculate distances between the mobile terminal apparatus and the plurality of display apparatuses based on time differences between a time at which the UWB wireless radio waves were sent to the plurality of display apparatuses and times at which the UWB wireless radio waves were received from the plurality of display apparatus.

It should be noted that the present invention includes the mobile terminal apparatus included in any one of the evacuation systems described above.

Moreover, in order to attain the object, a mobile terminal apparatus of the present invention, connected to, via a network, a plurality of evacuation directive apparatuses each of which, when receiving request data, (i) reads, out of a storage section, evacuation route information corresponding to an installation site of the evacuation directive apparatus, and (ii) sends the evacuation route information to a sender of the request data, includes: an arithmetic section for calculating a positional relationship between the mobile terminal apparatus and each of the plurality of evacuation directive apparatuses; a destination selecting section for selecting a particular evacuation directive apparatus from among the plurality of the evacuation directive apparatuses based on a result of the calculation carried out by the arithmetic section; a data communication section for (i) sending the request data to the particular evacuation directive apparatus selected by the destination selecting section, and (ii) receiving the evacuation route information read out by the particular evacuation directive apparatus; and a display section for displaying the evacuation route information received by the data communication section.

With the arrangement described above, it becomes possible to provide a mobile terminal apparatus used in the evacuation route obtaining system of the present invention. The mobile terminal apparatus achieves the same effect as the mobile terminal apparatus of the evacuation route obtaining system, so that a user can perform easy operation procedures in order to obtain and display easy evacuation route information. Thus, the user can feel secure and can be evacuated safely.

In order to attain the object, an evacuation route obtaining method according to the present invention, for obtaining an evacuation route by use of a mobile terminal apparatus connected to, via a network, a plurality of evacuation directive apparatuses each of which, when receiving request data, (i) reads, out of a storage section, evacuation route information corresponding to an installation site of the evacuation directive apparatus, and (ii) sends the evacuation route information to a sender of the request data, includes the steps of: (i) calculating a positional relationship between the mobile terminal apparatus and each of the plurality of evacuation directive apparatuses; (ii) selecting a particular evacuation directive apparatus from among the plurality of evacuation directive apparatuses based on a result of the step (i); (iii) sending the request data to the particular evacuation directive apparatus selected in the step (ii), and receiving the evacuation route information read out by the particular evacuation directive apparatus; and (iv) displaying the evacuation route information received in the step (iii).

With the method described above, it is possible to achieve the same effect as the mobile terminal apparatus used in the evacuation route obtaining system of the present invention, so that a user can perform easy operation procedures in order to obtain and display easy evacuation route information. Thus, the user can feel secure and can be evacuated safely.

Further, the mobile terminal apparatus of the present invention may be realized by use of a computer. The present invention includes an evacuation route obtaining program for realizing each step of the evacuation obtaining method, and a computer-readable storage medium in which the evacuation route obtaining program is stored.

With these arrangements, the evacuation route obtaining program is read out and executed by a computer. This realizes the same effect as the mobile terminal apparatus used in the evacuation route system of the present invention.

Moreover, in order to attain the object, an evacuation directive apparatus of the present invention, connected to a mobile terminal apparatus via a network, includes a sending/receiving section which, when receiving request data from the mobile terminal apparatus, (i) reads, out of a storage section, evacuation route information corresponding to an installation site of the evacuation directive apparatus, and (ii) sends the evacuation route information to the mobile terminal apparatus.

With the arrangement described above, it becomes possible to provide the evacuation directive apparatus used in the evacuation route obtaining system of the present invention, and achieve the same effect as the evacuation directive apparatus of the evacuation route obtaining system of the present invention.

Further, in order to attain the object, an evacuation route sending method according to the present invention, for sending an evacuation route by use of an evacuation directive apparatus connected to a mobile terminal apparatus via a network, includes the steps of: receiving request data from the mobile terminal apparatus; reading, out of a storage section, evacuation route information corresponding to an installation site of the evacuation directive apparatus; and sending the evacuation route information to the mobile terminal apparatus.

With the method described above, it is possible to have the same effect as the evacuation directive apparatus used in the evacuation route obtaining system of the present invention.

Furthermore, the evacuation directive apparatus of the present invention can be realized by use of a computer. The present invention includes an evacuation route sending program for realizing each step of the evacuation route sending method, and a computer-readable storage medium in which the evacuation route sending program is stored.

With these arrangements, the evacuation route sending program is read out and executed by a computer. This realizes the same effect as the evacuation directive apparatus used in the evacuation obtaining system of the present invention.

Furthermore, in order to attain the object described above, an electronic conference system of the present invention may include an evacuation directive apparatus connected to a mobile terminal apparatus via a network, the evacuation directive apparatus being at least one of a display apparatus, a storage apparatus, and a printing apparatus, each of which functions as an evacuation directive apparatus including a sending/receiving section which, when receiving request data from the mobile terminal apparatus, (i) reads, out of a storage section, evacuation route information corresponding to an installation site of the evacuation directive apparatuses, and (ii) sends the evacuation route information to the mobile terminal apparatus.

With the arrangement described above, at least one of the display apparatus, the storage apparatus, and the printing apparatus achieves the same effect as the evacuation route obtaining system used in the evacuation route obtaining system of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An evacuation route obtaining system comprising:
   a mobile terminal apparatus; and
   a plurality of evacuation directive apparatuses being connected with the mobile terminal apparatus via a network, wherein:
   each of the plurality of evacuation directive apparatuses comprises a sending/receiving section which, when receiving request data from the mobile terminal apparatus, (i) reads, out of a storage section, evacuation route information corresponding to an installation site of the evacuation directive apparatus, and (ii) sends the evacuation route information to the mobile terminal apparatus; and
   the mobile terminal apparatus comprises:
      an arithmetic section for calculating a positional relationship between the mobile terminal apparatus and each of the plurality of evacuation directive apparatuses;
      a destination selecting section for selecting a particular evacuation directive apparatus from among the plurality of evacuation directive apparatuses based on a result of the calculation carried out by the arithmetic section;
      a data communication section for (i) sending the request data to the particular evacuation directive apparatus selected by the destination selecting section, and (ii) receiving the evacuation route information read out by the particular evacuation directive apparatus; and
      a display section for displaying the evacuation route information received by the data communication section.

2. The evacuation route obtaining system according to claim 1, wherein:
   each of the plurality of evacuation directive apparatuses is a display apparatus connected with the mobile terminal apparatus via a first network, and the storage section is a storage apparatus connected with each of the plurality of display apparatuses via a second network.

3. The evacuation route obtaining system according to claim 1, wherein:
   the mobile terminal apparatus further comprises an input section for accepting an input from a user, the display section displaying information created based on the result of the calculation carried out by the arithmetic section, which information indicates the positional relationship between each of the plurality of evacuation directive apparatuses and the mobile terminal apparatus;
   the input section accepts an input that designates a particular evacuation directive apparatus; and
   the destination selecting section selects the particular evacuation directive apparatus that is designated by the input accepted by the input section.

4. The evacuation route obtaining system according to claim 1, wherein:
   the storage section stores therein evacuation information associated with emergency information for an emergency situation, and used in an evacuation from the installation site of the evacuation directive apparatus;
   each of the plurality of evacuation directive apparatuses is connected to a printing apparatus; and
   each of the plurality of evacuation directive apparatuses further comprises:
      an information display section;
      an emergency signal detection section for detecting a signal of the emergency information; and
      a control section which, when the emergency signal detection section detects the signal of the emergency information, (i) causes the storage section to store display information that is displayed on the information display section at the time that the signal is detected, (ii) reads the evacuation information out of the storage section, (iii) causes the information display section to display the evacuation information and the emergency information, and (iv) causes the printing apparatus to print out the evacuation information.

5. The evacuation route obtaining system according to claim 4, wherein:
   the evacuation information includes at least one of small-scale evacuation route information that is smaller in scale than the evacuation route information, and information of instructions for an emergency situation.

6. The evacuation route obtaining system according to claim 4, wherein:
   each of the plurality of evacuation directive apparatuses further comprises an audio output apparatus; and
   the evacuation information includes audio information;
   and the control section reads out the audio information included in the evacuation information and causes the audio output apparatus to output the audio information if the emergency signal detection section detects the signal of the emergency information.

7. The evacuation route obtaining system according to claim 4, wherein:
   the storage section is a removable storage medium in which the evacuation route information and the evacuation information are stored, and the storage section further stores the display information.

8. The evacuation route obtaining system according to claim 7, wherein:
   the storage medium is a medium whose information recording and information reading are carried out by use of a laser beam.

9. The evacuation route obtaining system according to claim 7, wherein:
   the storage medium includes a read-only ROM layer on which the evacuation route information and the evacuation information have been stored in advance, or a write-once storage layer on which writing is performable only once.

10. The evacuation route obtaining system according to claim 4, wherein:
    each of the plurality of evacuation directive apparatuses is connected to an image capturing apparatus, for obtaining image data by capturing an image of the installation site of the evacuation directive apparatus, and the control section counts how many people are included in the image data and controls the printing apparatus to print out the evacuation information on sheet(s) as many as the count of the people.

11. The evacuation route obtaining system according to claim 2, wherein:
    the first network directly connects the mobile terminal apparatus to each of the plurality of display apparatuses, and the second network directly connects the plurality of display apparatuses respectively to the storage apparatus corresponding thereto.

12. The evacuation route obtaining system according to claim 2, wherein:
    the first network is a UWB wireless network.

13. The evacuation route obtaining system according to claim 12, wherein:

the mobile terminal apparatus and each of the plurality of display apparatuses have a UWB wireless interface respectively, or are provided with a UWB wireless adapter respectively.

14. The evacuation route obtaining system according to claim 12, wherein:
as the positional relationship, the arithmetic section calculates azimuth directions from the mobile terminal apparatus with respect to the plurality of display apparatuses based on distortion differences between radiation patterns of UWB wireless radio waves sent to the plurality of display apparatuses and radiation patterns of UWB wireless radio waves received from the plurality of display apparatuses.

15. The evacuation route obtaining system according to claim 12, wherein:
as the positional relationship, the arithmetic section calculates distances between the mobile terminal apparatus and the plurality of display apparatuses based on time differences between a time at which the UWB wireless radio waves were sent to the plurality of display apparatuses and times at which the UWB wireless radio waves were received from the plurality of display apparatus.

16. A mobile terminal apparatus connected to, via a network, a plurality of evacuation directive apparatuses each of which, when receiving request data, (i) reads, out of a storage section, evacuation route information corresponding to an installation site of the evacuation directive apparatus, and (ii) sends the evacuation route information to a sender of the request data, the mobile terminal apparatus comprising:
an arithmetic section for calculating a positional relationship between the mobile terminal apparatus and each of the plurality of evacuation directive apparatuses;
a destination selecting section for selecting a particular evacuation directive apparatus from among the plurality of the evacuation directive apparatuses based on a result of the calculation carried out by the arithmetic section;
a data communication section for (i) sending the request data to the particular evacuation directive apparatus selected by the destination selecting section, and (ii) receiving the evacuation route information read out by the particular evacuation directive apparatus; and
a display section for displaying the evacuation route information received by the data communication section.

17. An evacuation route obtaining method for obtaining an evacuation route by use of a mobile terminal apparatus connected to, via a network, a plurality of evacuation directive apparatuses each of which, when receiving request data, (i) reads, out of a storage section, evacuation route information corresponding to an installation site of the evacuation directive apparatus, and (ii) sends the evacuation route information to a sender of the request data, the evacuation route obtaining method comprising the steps of:
(i) calculating a positional relationship between the mobile terminal apparatus and each of the plurality of evacuation directive apparatuses;
(ii) selecting a particular evacuation directive apparatus from among the plurality of evacuation directive apparatuses based on a result of the step (i);
(iii) sending the request data to the particular evacuation directive apparatus selected in the step (ii), and receiving the evacuation route information read out by the particular evacuation directive apparatus; and
(iv) displaying the evacuation route information received in the step (iii).

18. A non-transitory computer-readable storage medium in which a program is stored, the program controlling a mobile terminal apparatus connected to, via a network, a plurality of evacuation directive apparatuses each of which, when receiving request data, (i) reads, out of a storage section, evacuation route information corresponding to an installation site of the evacuation directive apparatus, and (ii) sends the evacuation route information to a sender of the request data, the program causing a computer for controlling the mobile terminal apparatus to execute the steps of: (i) calculating a positional relationship between the mobile terminal apparatus and each of the plurality of evacuation directive apparatuses; (ii) selecting a particular evacuation directive apparatus from among the plurality of evacuation directive apparatuses based on a result of the step (i); (iii) sending the request data to the particular evacuation directive apparatus selected in the step (ii), and receiving the evacuation route information read out by the particular evacuation directive apparatus; and (iv) displaying the evacuation route information received in the step (iii).

19. An electronic conference system comprising:
a mobile terminal apparatus; and
a plurality of evacuation directive apparatuses being connected with the mobile terminal apparatus via a network,
each of the plurality of evacuation directive apparatuses being at least one of a display apparatus, a storage apparatus, and a printing apparatus,
each of the plurality of evacuation directive apparatuses comprising a sending/receiving section which, when receiving request data from the mobile terminal apparatus, (i) reads, out of a storage section, evacuation route information corresponding to an installation site of the evacuation directive apparatuses, and (ii) sends the evacuation route information to the mobile terminal apparatus,
the mobile terminal apparatus comprising:
an arithmetic section for calculating a positional relationship between the mobile terminal apparatus and each of the plurality of evacuation directive apparatuses;
a destination selecting section for selecting a particular evacuation directive apparatus from among the plurality of evacuation directive apparatuses based on a result of the calculation carried out by the arithmetic section;
a data communication section for sending the request data to the particular evacuation directive apparatus selected by the destination selecting section, and receiving the evacuation route information read out by the particular evacuation directive apparatus; and
a display section for displaying the evacuation route information received by the data communication section.

* * * * *